United States Patent
Merlin et al.

(10) Patent No.: US 9,699,086 B2
(45) Date of Patent: Jul. 4, 2017

(54) METHODS AND APPARATUS FOR MULTI-USER UPLINK

(71) Applicant: QUALCOMM Incorporated, San Diego, CA (US)

(72) Inventors: Simone Merlin, Solana Beach, CA (US); Gwendolyn Denise Barriac, Encinitas, CA (US); Hemanth Sampath, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 14/469,400

(22) Filed: Aug. 26, 2014

(65) Prior Publication Data

US 2015/0063291 A1  Mar. 5, 2015

Related U.S. Application Data

(60) Provisional application No. 61/871,269, filed on Aug. 28, 2013.

(51) Int. Cl.
*H04J 3/16* (2006.01)
*H04L 12/801* (2013.01)
(Continued)

(52) U.S. Cl.
CPC ........... *H04L 47/12* (2013.01); *H04B 7/0452* (2013.01); *H04B 7/2621* (2013.01);
(Continued)

(58) Field of Classification Search
CPC ... H04W 72/0472; H04W 72/121; H04J 3/24; H04Q 7/24
(Continued)

(56) References Cited

U.S. PATENT DOCUMENTS 7,352,718 B1 * 4/2008 Perahia ................ H04B 7/0413
                                                                 370/210
7,376,122 B2   5/2008 Draves, Jr. et al.
(Continued)

FOREIGN PATENT DOCUMENTS

| EP | 1589784 A2 | 10/2005 |
| EP | 2429250 A1 | 3/2012 |

(Continued)

OTHER PUBLICATIONS

Gong M.X., et al., "Multi-User Operation in mmWave Wireless Networks", ICC 2011-2011 IEEE International Conference on Communications-Jun. 5-9, 2011—Kyoto,Japan, IEEE, Piscataway, NJ, USA, Jun. 5, 2011, pp. 1-6, XP031908919.
(Continued)

*Primary Examiner* — Hanh N Nguyen
(74) *Attorney, Agent, or Firm* — Knobbe, Martens, Olson & Bear, LLP

(57) ABSTRACT

Methods and apparatus for multiple user uplink are provided. In one aspect, a method for wireless communication includes generating a first wireless message granting permission for a first station to transmit during a transmission opportunity, generating a second wireless message granting permission for a second station to transmit during the transmission opportunity; and transmitting the first wireless message to the first station at least partially concurrently with transmission of the second wireless message to the second station.

24 Claims, 15 Drawing Sheets

(51) Int. Cl.

| | | |
|---|---|---|
| *H04L 12/851* | (2013.01) | |
| *H04B 7/26* | (2006.01) | |
| *H04L 5/00* | (2006.01) | |
| *H04W 72/04* | (2009.01) | |
| *H04B 7/0452* | (2017.01) | |
| *H04W 52/14* | (2009.01) | |
| *H04L 1/18* | (2006.01) | |
| *H04W 72/12* | (2009.01) | |
| *H04W 74/00* | (2009.01) | |
| *H04W 74/04* | (2009.01) | |
| *H04L 1/16* | (2006.01) | |
| *H04L 1/00* | (2006.01) | |
| *H04W 28/24* | (2009.01) | |
| *H04W 74/08* | (2009.01) | |
| *H04W 28/06* | (2009.01) | |

(52) U.S. Cl.
CPC .......... *H04L 1/1854* (2013.01); *H04L 1/1858* (2013.01); *H04L 1/1861* (2013.01); *H04L 5/003* (2013.01); *H04L 5/0005* (2013.01); *H04L 5/0007* (2013.01); *H04L 5/0037* (2013.01); *H04L 5/0055* (2013.01); *H04L 47/14* (2013.01); *H04L 47/24* (2013.01); *H04W 52/146* (2013.01); *H04W 72/042* (2013.01); *H04W 72/0413* (2013.01); *H04W 72/0446* (2013.01); *H04W 72/0453* (2013.01); *H04W 72/12* (2013.01); *H04W 72/1284* (2013.01); *H04W 72/1289* (2013.01); *H04W 74/006* (2013.01); *H04W 74/008* (2013.01); *H04W 74/04* (2013.01); *H04W 74/08* (2013.01); *H04L 1/1607* (2013.01); *H04L 2001/0093* (2013.01); *H04W 28/06* (2013.01); *H04W 28/24* (2013.01); *H04W 72/121* (2013.01); *H04W 74/085* (2013.01)

(58) Field of Classification Search
USPC ....... 370/203–210, 338, 349, 329, 468, 390, 370/389, 395.21
See application file for complete search history.

(56) References Cited

U.S. PATENT DOCUMENTS

| 7,995,583 | B2* | 8/2011 | Del Prado Pavon ............... H04W 72/1278 370/311 |
|---|---|---|---|
| 8,571,010 | B1* | 10/2013 | Zhang ..................... H04L 29/10 370/230 |
| 8,867,329 | B2* | 10/2014 | Hui ......................... H04B 3/54 370/207 |
| 9,113,478 | B2* | 8/2015 | Wentink ............... H04W 74/006 |
| 9,137,815 | B2* | 9/2015 | Sampath ............. H04W 72/121 |
| 9,253,767 | B2* | 2/2016 | Wang ..................... H04L 5/0023 |
| 2002/0105970 | A1 | 8/2002 | Shvodian |
| 2003/0091066 | A1 | 5/2003 | Choi et al. |
| 2005/0195784 | A1 | 9/2005 | Freedman et al. |
| 2007/0110055 | A1 | 5/2007 | Fischer et al. |
| 2007/0230493 | A1 | 10/2007 | Dravida et al. |
| 2007/0248117 | A1 | 10/2007 | Zuniga et al. |
| 2008/0037570 | A1 | 2/2008 | Kim et al. |
| 2008/0151831 | A1* | 6/2008 | Khan ................... H04L 1/0656 370/330 |
| 2008/0273488 | A1 | 11/2008 | Shaheen |
| 2009/0067358 | A1 | 3/2009 | Fischer |
| 2009/0147768 | A1 | 6/2009 | Ji et al. |
| 2010/0008318 | A1 | 1/2010 | Wentink et al. |
| 2010/0271992 | A1 | 10/2010 | Wentink et al. |
| 2010/0284393 | A1 | 11/2010 | Abraham et al. |
| 2010/0298016 | A1 | 11/2010 | Madan et al. |
| 2010/0315999 | A1 | 12/2010 | Kakani et al. |
| 2011/0134900 | A1 | 6/2011 | Liu et al. |
| 2011/0150004 | A1 | 6/2011 | Denteneer et al. |
| 2011/0154144 | A1 | 6/2011 | Nanda |
| 2011/0205968 | A1 | 8/2011 | Kim et al. |
| 2011/0205997 | A1 | 8/2011 | Chun et al. |
| 2011/0222408 | A1 | 9/2011 | Kasslin et al. |
| 2011/0222499 | A1 | 9/2011 | Park et al. |
| 2011/0261708 | A1 | 10/2011 | Grandhi |
| 2011/0268054 | A1 | 11/2011 | Abraham et al. |
| 2011/0268094 | A1 | 11/2011 | Gong et al. |
| 2011/0286402 | A1 | 11/2011 | Gong et al. |
| 2011/0305205 | A1 | 12/2011 | Gong et al. |
| 2011/0305209 | A1 | 12/2011 | Merlin et al. |
| 2012/0026928 | A1 | 2/2012 | Gong et al. |
| 2012/0057471 | A1 | 3/2012 | Amini et al. |
| 2012/0060075 | A1 | 3/2012 | Gong et al. |
| 2012/0117446 | A1 | 5/2012 | Taghavi et al. |
| 2012/0124263 | A1 | 5/2012 | Zhou et al. |
| 2012/0147804 | A1 | 6/2012 | Hedayat et al. |
| 2012/0314697 | A1 | 12/2012 | Noh et al. |
| 2012/0327915 | A1 | 12/2012 | Kang et al. |
| 2013/0114606 | A1 | 5/2013 | Schrum, Jr. et al. |
| 2013/0114622 | A1 | 5/2013 | Veyseh et al. |
| 2013/0188567 | A1* | 7/2013 | Wang .................... H04L 5/0094 370/329 |
| 2013/0286959 | A1 | 10/2013 | Lou et al. |
| 2014/0173682 | A1 | 6/2014 | Xiao et al. |
| 2014/0269544 | A1 | 9/2014 | Zhu et al. |
| 2014/0334387 | A1 | 11/2014 | Doppler et al. |
| 2015/0063111 | A1 | 3/2015 | Merlin et al. |
| 2015/0063190 | A1 | 3/2015 | Merlin et al. |
| 2015/0063191 | A1 | 3/2015 | Merlin et al. |
| 2015/0063257 | A1 | 3/2015 | Merlin et al. |
| 2015/0063258 | A1 | 3/2015 | Merlin et al. |
| 2015/0063318 | A1 | 3/2015 | Merlin et al. |
| 2015/0063320 | A1 | 3/2015 | Merlin et al. |
| 2016/0021678 | A1 | 1/2016 | Merlin et al. |
| 2016/0294530 | A1 | 10/2016 | Merlin et al. |

FOREIGN PATENT DOCUMENTS

| JP | 2013135426 A | 7/2013 |
|---|---|---|
| KR | 20110058709 A | 6/2011 |
| WO | WO-2008155624 A2 | 12/2008 |

OTHER PUBLICATIONS

IEEE Standard for Information technology-Telecommunications and information exchange between systems-Local and metropolitan area networks-Specific requirements—Part 11: Wireless LAN Medium Access Control (MAC) and Physical Layer (PHY) Specifications/Part 11, IEEE Std 802.11; Jun. 12, 2007, pp. 251-312; XP002555935.
International Search Report and Written Opinion—PCT/US2014/052845—ISA/EPO—Feb. 5, 2015.
Partial International Search Report—PCT/US2014/052845—ISA/EPO—Nov. 10, 2014.

* cited by examiner

METHODS AND APPARATUS FOR MULTI-USER UPLINK

This application claims priority to U.S. Provisional Application No. 61/871,269 filed Aug. 28, 2013, and entitled "METHODS AND APPARATUS FOR MULTIPLE USER UPLINK." The content of this prior application is considered part of this application, and is hereby incorporated by reference in its entirety.

FIELD

Certain aspects of the present disclosure generally relate to wireless communications, and more particularly, to methods and apparatus for multiple user uplink communication in a wireless network.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple user terminals to communicate with a single access point by sharing the channel resources while achieving high data throughputs. With limited communication resources, it is desirable to reduce the amount of traffic passing between the access point and the multiple terminals. For example, when multiple terminals send uplink communications to the access point, it is desirable to minimize the amount of traffic to complete the uplink of all transmissions. Thus, there is a need for an improved protocol for uplink transmissions from multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect disclosed is a method of wireless communication. The method includes generating a first wireless message granting permission for a first station to transmit during a transmission opportunity, generating a second wireless message granting permission for a second station to transmit during the transmission opportunity, and transmitting the first wireless message to the first station at least partially concurrently with transmission of the second wireless message to the second station. In some aspects, the method includes transmitting the first wireless message over a first spatial stream; and transmitting the second wireless message over a second spatial stream. In some aspects, the method includes transmitting the first wireless message over a first frequency; and transmitting the second wireless message over a second frequency. In some aspects, the method includes initiating transmission of the first and second wireless messages at the same time.

In some aspects, the method also includes generating the first and second wireless messages to indicate a start time and duration of the transmission opportunity. In some aspects, the method also includes generating the first and second wireless messages to each comprise an indicator indicating a first and second spatial stream that the first and second stations respectively should use for transmissions during the transmission opportunity. In some aspects, the method includes generating the first and second wireless messages to each comprise an indicator indicating a first and second frequency that the first and second stations respectively should use for transmissions during the transmission opportunity.

In some aspects, the method includes further generating the first wireless message to grant permission for a third station to transmit during the transmission opportunity, and transmitting the first wireless message to the third station at least partially concurrently with the transmission of the second wireless message to the second station. In some aspects, the method includes generating a third wireless message directing the first station to initiate a transmission a predetermined elapsed time after receipt of the third wireless message, generating a fourth wireless message directing the second station to initiate transmission after a predetermined elapsed time after the fourth wireless message, and transmitting the third wireless message to the first station at least partially concurrently with transmitting the fourth wireless message to the second station.

In some aspects, the method includes generating the first wireless message to indicate a first time within the transmission opportunity when the first wireless device should initiate transmission; and generating the second wireless message to indicate a second time within the transmission opportunity when the second wireless device should initiate transmission, wherein the first and second times are different. In some aspects, the method includes generating the first message as an aggregated media protocol data unit (A-MPDU). In some aspects, the method includes generating the first message to comprise a data, control, or management message. In some aspects, the method includes generating the first wireless message to grant permission for a third station to transmit during a transmission opportunity, wherein the transmission of the first wireless message is also to the third station.

Another aspect disclosed is an apparatus for wireless communication. The apparatus includes a processor configured to generate a first wireless message granting permission for a first station to transmit during a transmission opportunity and generate a second wireless message granting permission for a second station to transmit during the transmission opportunity; and a transmitter configured to transmit the first wireless message to the first station at least partially concurrently with transmission of the second wireless message to the second station. In some aspects of the apparatus, the transmitter is further configured to transmit the first wireless message over a first spatial stream, and transmit the second wireless message over a second spatial stream. In some aspects of the apparatus, the transmitter is further configured to transmit the first wireless message over a first frequency, and transmitting the second wireless message over a second frequency.

In some aspects of the apparatus, the processor is further configured to generate the first and second wireless messages to each comprise an indicator indicating a first and second spatial stream that the first and second stations respectively should use for transmissions during the transmission opportunity. In some aspects of the apparatus, the processor is further configured to generate the first and second wireless messages to each comprise an indicator indicating a first and second frequency that the first and second stations respectively should use for transmissions during the transmission opportunity. In some aspects of the apparatus, the transmitter is further configured to initiate transmission of the first and second wireless messages at the same time. In some aspects of the apparatus, the processor is further configured to generate the first and second wireless messages to indicate a start time and duration of the transmission opportunity.

In some aspects of the apparatus, the processor is further configured to generate the first wireless message to grant permission for a third station to transmit during the transmission opportunity, and transmitting the first wireless message to the third station at least partially concurrently with the transmission of the second wireless message to the second station. In some aspects of the apparatus, the processor is further configured to generate a third wireless message directing the first station to initiate a transmission a predetermined elapsed time after receipt of the third wireless message, generate a fourth wireless message directing the second station to initiate transmission a predetermined elapsed time after the fourth wireless message, and the transmitter is further configured to transmit the third wireless message to the first station at least partially concurrently with transmitting the fourth wireless message to the second station.

In some aspects of the apparatus, the processor is further configured to generate the first wireless message to indicate a first time within the transmission opportunity when the first wireless device should initiate transmission, and generate the second wireless message to indicate a second time within the transmission opportunity when the second wireless device should initiate transmission, wherein the first and second times are different. In some aspects of the apparatus, the processor is further configured to generate the first message as an aggregated media protocol data unit (A-MPDU). In some aspects of the apparatus, the processor is further configured to generate the first message to comprise a data, control, or management message. In some aspects of the apparatus, the processor is further configured to generate the first wireless message to grant permission for a third station to transmit during a transmission opportunity; wherein the transmission of the first wireless message is also to the third station.

Another aspect disclosed is a method of wireless communication. The method includes receiving, via a first device, a first message granting permission for the first device to transmit a message during a transmission opportunity at least partially concurrently with transmission of at least a portion of a second message addressed to a second device; and transmitting, via the first device, a second message to a third device during the transmission opportunity at least partially concurrently with a transmission by a fourth device to the third device. Some aspects of the method include receiving, via the first device, a third message; and decoding the third message to determine the first device should initiate transmission during the transmission opportunity at a particular time, wherein the transmission of the second message is initiated at the particular time based on the third message.

Another aspect disclosed is an apparatus for wireless communication. The apparatus includes a receiver configured to receive a first message granting permission for the first device to transmit a message during a transmission opportunity at least partially concurrently with transmission of at least a portion of a second message addressed to a second device; and a transmitter configured to transmit, via the first device, a second message to a third device during the transmission opportunity at least partially concurrently with a transmission by a fourth device to the third device. In some aspects of the apparatus, the receiver is further configured to receive a third message; and the processor is further configured to decode the third message to determine the first device should initiate transmission during the transmission opportunity at a particular time, wherein the transmitter is further configured to initiate the transmission of the second message at the particular time based on the third message.

DETAILED DESCRIPTION

Figure 1:
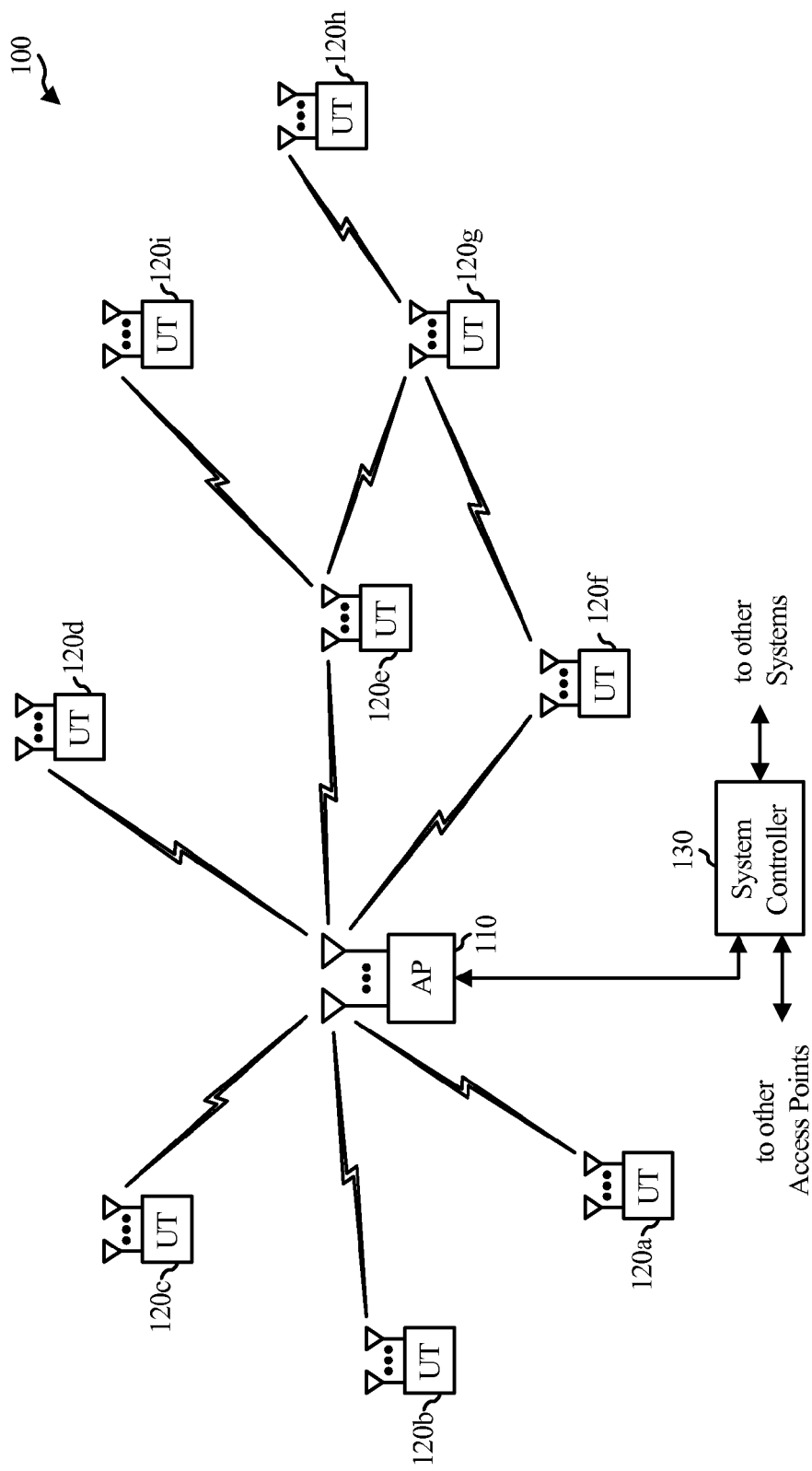
FIG. 1 illustrates a multiple-access multiple-input multiple-output (MIMO) system with access points and user terminals.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station "STA" may also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or using some other terminology. A user terminal or STA may be fixed or mobile and may also be referred to as a mobile station or a wireless device, or using some other terminology. The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, the AP 110 may be configured to communicate with both SDMA and non-SDMA user terminals. This approach may conveniently allow older versions of user terminals ("legacy" stations) that do not support SDMA to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \leq K \leq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal may transmit user-specific data to and/or receive user-specific data from the access point. In general, each selected user terminal may be equipped with one or multiple antennas (i.e., $N_{ut} \geq 1$). The K selected user terminals can have the same number of antennas, or one or more user terminals may have a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different user terminal 120.

Figure 2:
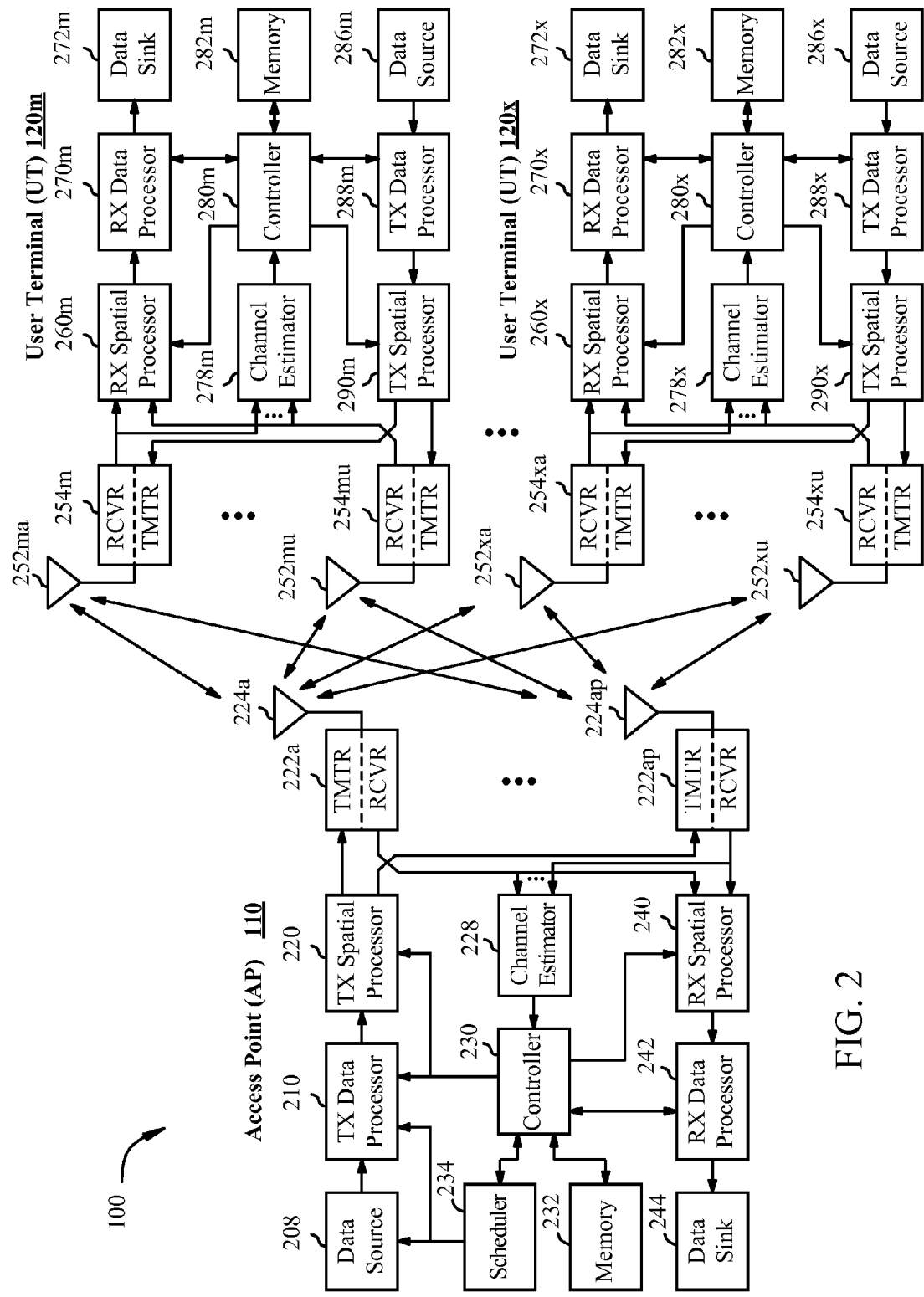
FIG. 2 illustrates a block diagram of the access point and two user terminals in a MIMO system.

FIG. 2 illustrates a block diagram of the access point 110 and two user terminals 120m and 120x in MIMO system 100. The access point 110 is equipped with $N_t$ antennas 224a through 224ap. The user terminal 120m is equipped with $N_{ut,m}$ antennas $252_{ma}$ through $252_{mu}$, and the user terminal 120x is equipped with $N_{ut,x}$ antennas $252_{xa}$ through $252_{xu}$. The access point 110 is a transmitting entity for the downlink and a receiving entity for the uplink. The user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the user terminal 120.

On the uplink, at each user terminal 120 selected for uplink transmission, a TX data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the access point 110.

$N_{up}$ user terminals may be scheduled for simultaneous transmission on the uplink. Each of these user terminals may perform spatial processing on its respective data symbol stream and transmit its respective set of transmit symbol streams on the uplink to the access point 110.

At the access point 110, $N_{up}$ antennas 224a through $224_{ap}$ receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{up}$ received symbol streams from $N_{up}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter unit 222 receives and processes a respective transmit symbol stream to generate a downlink signal. $N_{up}$ transmitter units 222 may provide $N_{up}$ downlink signals for transmission from $N_{up}$ antennas 224, for example to transmit to the user terminals 120.

At each user terminal 120, $N_{ut,m}$ antennas 252 receive the $N_{up}$ downlink signals from the access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
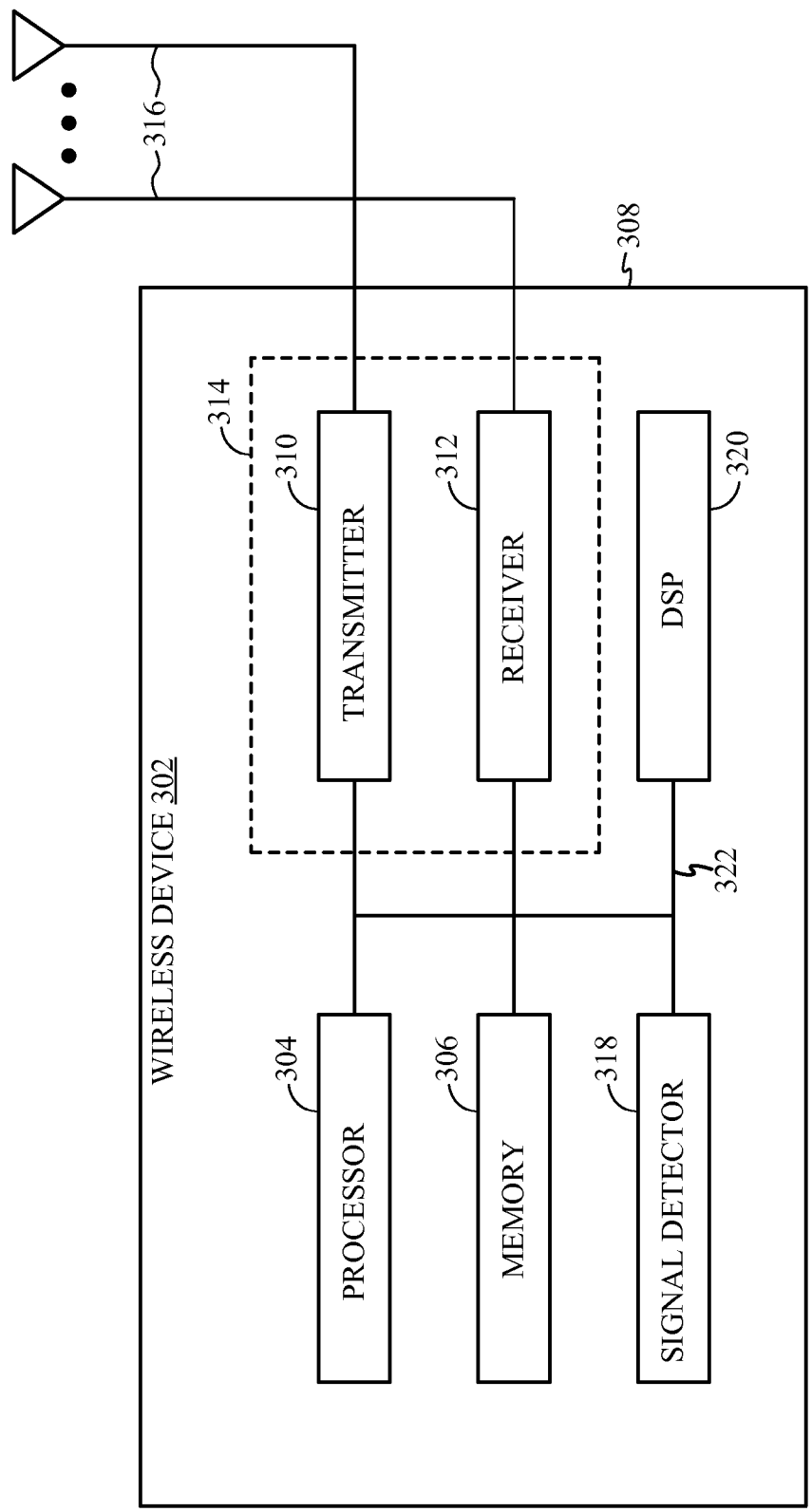
FIG. 3 illustrates various components that may be utilized in a wireless device that may be employed within a wireless communication system.

FIG. 3 illustrates various components that may be utilized in a wireless device 302 that may be employed within the wireless communication system 100. The wireless device 302 is an example of a device that may be configured to implement the various methods described herein. The wireless device 302 may implement an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transceiver antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure support transmitting an uplink (UL) signal from multiple STAs to an AP. In some embodiments, the UL signal may be transmitted in a multi-user MIMO (MU-MIMO) system. Alternatively, the UL signal may be transmitted in a multi-user FDMA (MU-FDMA) or similar FDMA system. Specifically, FIGS. 4-7 illustrate UL-MU-MIMO transmissions 410A, 410B, that would apply equally to UL-FDMA transmissions. In these embodiments, UL-MU-MIMO or UL-FDMA transmissions can be sent simultaneously from multiple STAs to an AP and may create efficiencies in wireless communication.

Figure 4:
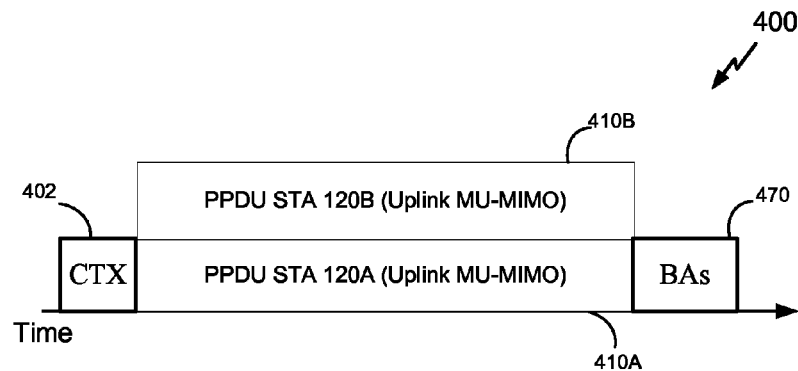
FIG. 4 shows a time diagram of an example frame exchange of an uplink (UL) MU-MIMO communication.

FIG. 4 is a time sequence diagram illustrating an example of an UL-MU-MIMO protocol 400 that may be used for UL communications. As shown in FIG. 4 and in conjunction with FIG. 1, an AP 110 may transmit a clear to transmit (CTX) message 402 to the user terminals 120 indicating which STAs may participate in the UL-MU-MIMO scheme, such that a particular STA knows to start an UL-MU-MIMO. An example of a CTX frame structure is described more fully below with reference to FIG. 10.

Once a user terminal 120 receives a CTX message 402 from the AP 110 where the user terminal is listed, the user terminal may transmit the UL-MU-MIMO transmission 410. In FIG. 4, STA 120A and STA 120B transmit UL-MU-MIMO transmission 410A and 410B containing physical layer convergence protocol (PLCP) protocol data units (PPDUs). Upon receiving the UL-MU-MIMO transmission 410, the AP 110 may transmit block acknowledgments (BAs) 470 to the user terminals 120.

Not all APs or user terminals 120 may support UL-MU-MIMO or UL-FDMA operation. A capability indication from a user terminal 120 may be indicated in a high efficiency wireless (HEW) capability element that is included in an association request or probe request and may include a bit indicating capability, the maximum number of spatial streams a user terminal 120 can use in a UL-MU-MIMO transmission, the frequencies a user terminal 120 can use in a UL-FDMA transmission, the minimum and maximum power and granularity in the power backoff, and the minimum and maximum time adjustment a user terminal 120 can perform.

A capability indication from an AP may be indicated in a HEW capability element that is included in an association response, beacon or probe response and may include a bit indicating capability, the maximum number of spatial streams a single user terminal 120 can use in a UL-MU-MIMO transmission, the frequencies a single user terminal 120 can use in a UL-FDMA transmission, the required power control granularity, and the required minimum and maximum time adjustment a user terminal 120 should be able to perform.

In one embodiment, capable user terminals 120 may request to a capable AP to be part of the UL-MU-MIMO (or UL-FDMA) protocol by sending a management frame to AP indicating request for enablement of the use of UL-MU-MIMO feature. In one aspect, an AP 110 may respond by granting the use of the UL-MU-MIMO feature or denying it. Once the use of the UL-MU-MIMO is granted, the user terminal 120 may expect a CTX message 402 at a variety of times. Additionally, once a user terminal 120 is enabled to operate the UL-MU-MIMO feature, the user terminal 120 may be subject to follow a certain operation mode. If multiple operation modes are possible, an AP may indicate to the user terminal 120 which mode to use in a HEW capability element or in an operation element. In one aspect the user terminals 120 can change the operation modes and parameters dynamically during operation by sending a different operating element to the AP 110. In another aspect the AP 110 may switch operation modes dynamically during operation by sending an updated operating element to a user terminal 120 or in a beacon. In another aspect, the operation modes may be indicated in the setup phase and may be setup per user terminal 120 or for a group of user terminals 120. In another aspect the operation mode may be specified per traffic identifier (TID).

Figure 5:
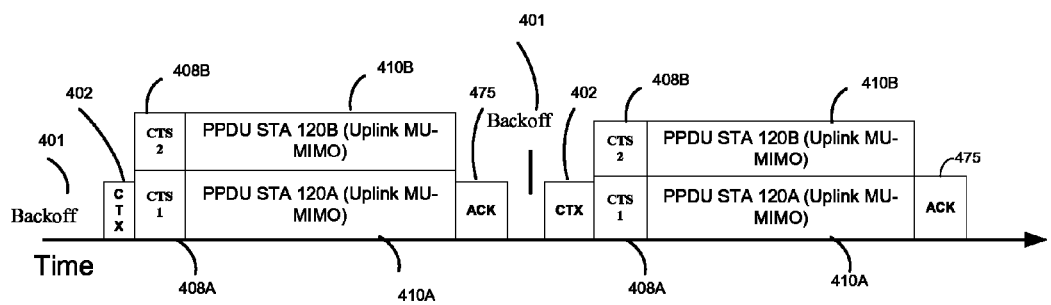
FIG. 5 shows a time diagram of another example frame exchange of an UL-MU-MIMO communication.

FIG. 5 is a time sequence diagram that, in conjunction with FIG. 1, illustrates an example of an operation mode of a UL-MU-MIMO transmission. In this embodiment, a user terminal 120 receives a CTX message 402 from an AP 110 and sends an immediate response to the AP 110. The response may be in the form of a clear to send (CTS) 408 or another similar signal. In one aspect, requirement to send a CTS may be indicated in the CTX message 402 or may be indicated in the setup phase of the communication. As shown in FIG. 5, STA 120 A and STA 120B may transmit a CTS 1 408A and CTS 2 408B message in response to receiving the CTX message 402. The modulation and coding scheme (MCS) of the CTS 1 408A and CTS 2 408B may be based on the MCS of the CTX message 402. In this embodiment, CTS 1 408A and CTS 2 408B contain the same bits and the same scrambling sequence so that they may be transmitted to the AP 110 at the same time. The duration field of the CTS 408 signals may be based on the duration field in the CTX by removing the time for the CTX PPDU. The UL-MU-MIMO transmission 410A and 410B are then sent by the STAs 120A and 120B as listed in the CTX 402 signals. The AP 110 may then send acknowledgment (ACK) signals the STAs 120A and 120B. In some aspects, the ACK signals may be serial ACK signals to each station or BAs. In some aspects the ACKs may be polled. This embodiment creates efficiencies by simultaneously transmitting CTS 408 signals from multiple STAs to an AP 110 instead of sequentially, which saves time and reduces the possibility of interference.

Figure 6:
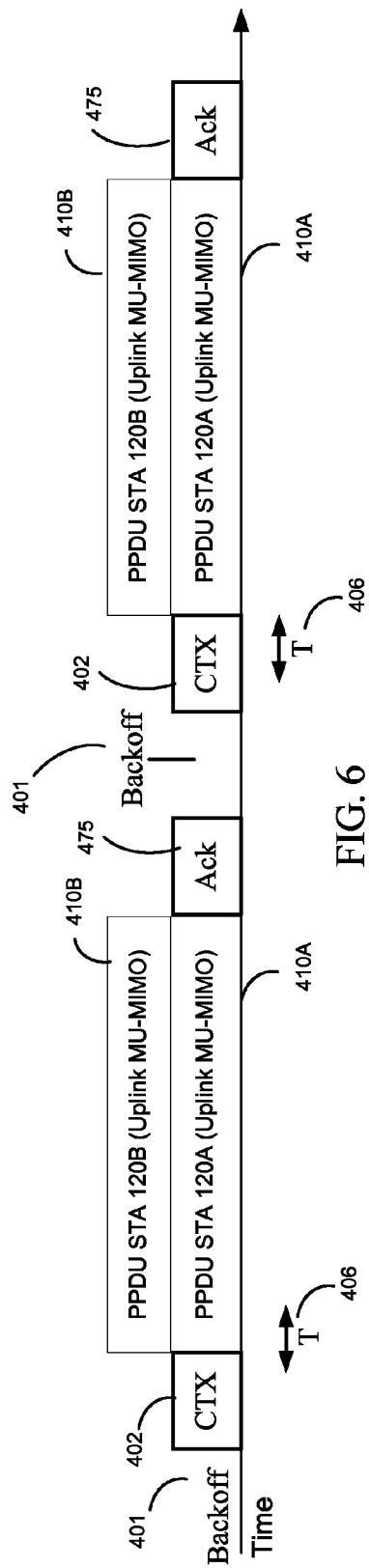
FIG. 6 shows a time diagram of another example frame exchange of an UL-MU-MIMO communication.

FIG. 6 is a time sequence diagram that, in conjunction with FIG. 1, illustrates another example of an operation mode of a UL-MU-MIMO transmission. In this embodiment, user terminals 120A and 120B receive a CTX message 402 from an AP 110 and are allowed to start and UL-MU-MIMO transmission a time (T) 406 after the end of the PPDU carrying the CTX message 402. The T 406 may be a short interframe space (SIFS), point interframe space (PIFS), or another time potentially adjusted with additional offsets as indicated by an AP 110 in the CTX message 402 or via a management frame. The SIFS and PIFS time may be fixed in a standard or indicated by an AP 110 in the CTX message 402 or in a management frame. The benefit of T 406 may be to improve synchronization or to allow a user terminal 120A and 120B time to process the CTX message 402 or other messages before transmission.

Referring to FIGS. 4-6, in conjunction with FIG. 1, the UL-MU-MIMO transmission 410 may have the same duration. The duration of the UL-MU-MIMO transmission 410 for user terminals utilizing the UL-MU-MIMO feature may be indicated in the CTX message 402 or during the setup phase. To generate a PPDU of the required duration, a user terminal 120 may build a PLCP service data unit (PSDU) so that the length of the PPDU matches the length indicated in the CTX message 402. In another aspect, a user terminal 120 may adjust the level of data aggregation in a media access control (MAC) protocol data unit (A-MPDU) or the level of data aggregation in a MAC service data units (A-MSDU) to approach the target length. In another aspect, a user terminal 120 may add end of file (EOF) padding delimiters to reach the target length. In another approach the padding or the EOF pad fields are added at the beginning of the A-MPDU. One of the benefits of having all the UL-MU-MIMO transmissions the same length is that the power level of the transmission will remain constant.

In some embodiments, a user terminal 120 may have data to upload to the AP but the user terminal 120 has not received a CTX message 402 or other signal indicating that the user terminal 120 may start a UL-MU-MIMO transmission.

In one operation mode, the user terminals 120 may not transmit outside an UL-MU-MIMO transmission opportunity (TXOP) (e.g., after CTX message 402). In another operational mode, user terminals 120 may transmit frames to initialize a UL-MU-MIMO transmission, and then may transmit during the UL-MU-MIMO TXOP, if for example, they are instructed to do so in a CTX message 402. In one embodiment, the frame to initialize a UL-MU-MIMO transmission may be a request to transmit (RTX), a frame specifically designed for this purpose (an example of a RTX frame structure is described more fully below with reference to FIG. 9). The RTX frames may be the only frames a user terminal 120 is allowed to use to initiate a UL MU MIMO TXOP. In one embodiment, the user terminal may not transmit outside an UL-MU-MIMO TXOP other than by sending an RTX. In another embodiment, a frame to initialize an UL MU MIMO transmission may be any frame which indicates to an AP 110 that a user terminal 120 has data to send. It may be pre-negotiated that these frames indicate a UL MU MIMO TXOP request. For example, the following may be used to indicate that a user terminal 120 has data to send and is requesting an UL MU MIMO TXOP: an RTS, a data frame or QoS Null frame with bits 8-15 of the QoS control frame set to indicate more data, or a PS poll. In one embodiment, the user terminal may not transmit outside an UL MU MIMO TXOP other than by sending frames to trigger this TXOP, where this frame may be an RTS, PS poll, or QOS null. In another embodiment, the user terminal may send single user uplink data as usual, and may indicate a request for a UL MU MIMO TXOP by setting bits in the QoS control frame of its data packet.

Figure 7:
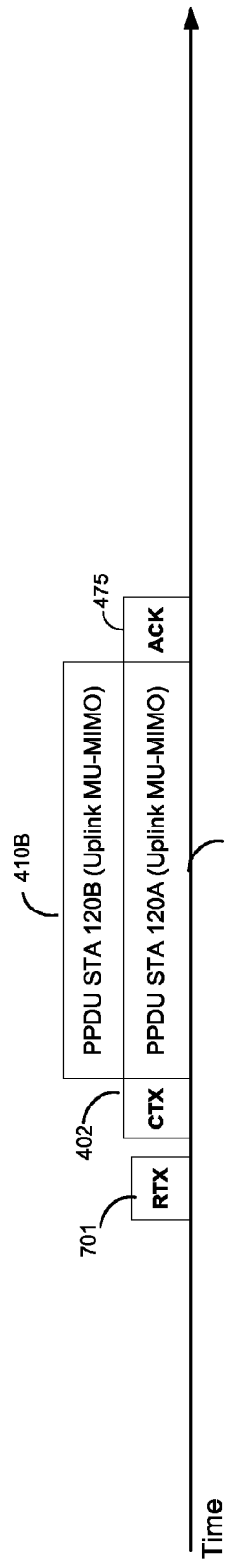
FIG. 7 shows a time diagram of another example frame exchange of an UL-MU-MIMO communication.

FIG. 7 is a time sequence diagram illustrating, in conjunction with FIG. 1, an example where the frame to initialize a UL-MU-MIMO is a RTX 701. In this embodiment the user terminal 120 sends to the AP 110 a RTX 701 that includes information regarding the UL-MU-MIMO transmission. As shown in FIG. 7, the AP 110 may respond to the RTX 701 with a CTX message 402 granting an UL-MU-MIMO TXOP to send the UL-MU-MIMO transmission 410 immediately following the CTX message 402. In another aspect, the AP 110 may respond with a CTS that grants a single-user (SU) UL TXOP. In another aspect, the AP 110 may respond with a frame (e.g., ACK or CTX with a special indication) that acknowledges the reception of the RTX 701 but does not grant an immediate UL-MU-MIMO TXOP. In another aspect, the AP 110 may respond with a frame that acknowledges the reception of the RTX 701, does not grant an immediate UL-MU-MIMO TXOP, but grants a delayed UL-MU-MIMO TXOP and may identify the time of the TXOP is granted. In this embodiment, the AP 110 may send a CTX message 402 to start the UL-MU-MIMO at the granted time.

In another aspect, the AP 110 may respond to the RTX 701 with an ACK or other response signal which does not grant the user terminal 120 an UL-MU-MIMO transmission but indicates that the user terminal 120 shall wait for a time (T) before attempting another transmission (e.g., sending another RTX). In this aspect the time (T) may be indicated by the AP 110 in the setup phase or in the response signal. In another aspect an AP 110 and a user terminal 120 may agree on a time which the user terminal 120 may transmit a RTX 701, RTS, PS-poll, or any other request for a UL-MU-MIMO TXOP.

In another operation mode, user terminals 120 may transmit requests for UL-MU-MIMO transmissions 410 in accordance with regular contention protocol. In another aspect, the contention parameters for user terminals 120 using UL-MU-MIMO are set to a different value than for other user terminals that are not using the UL-MU-MIMO feature. In this embodiment, the AP 110 may indicate the value of the contention parameters in a beacon, association response or through a management frame. In another aspect, the AP 110 may provide a delay timer that prevents a user terminal 120 from transmitting for a certain amount of time after each successful UL-MU-MIMO TXOP or after each RTX, RTS, PS-poll, or QoS null frame. The timer may be restarted after each successful UL-MU-MIMO TXOP. In one aspect, the AP 110 may indicate the delay timer to user terminals 120 in the setup phase or the delay timer may be different for each user terminal 120. In another aspect, the AP 110 may indicate the delay timer in the CTX message 402 or the delay timer may be dependent on the order of the user terminals 120 in the CTX message 402, and may be different for each terminal.

In another operational mode, the AP 110 may indicate a time interval during which the user terminals 120 are allowed to transmit a UL-MU-MIMO transmission. In one aspect, the AP 110 indicates a time interval to the user terminals 120 during which the user terminals are allowed to send a RTX or RTS or other request to the AP 110 to ask for an UL-MU-MIMO transmission. In this aspect, the user terminals 120 may use regular contention protocol. In another aspect, the user terminals may not initiate a UL-MU-MIMO transmission during the time interval but the AP 110 may send a CTX or other message to the user terminals to initiate the UL-MU-MIMO transmission.

In certain embodiments, a user terminal 120 enabled for UL-MU-MIMO may indicate to an AP 110 that it requests an UL-MU-MIMO TXOP because it has data pending for UL. In one aspect, the user terminal 120 may send a RTS or a PS-poll to request a UL-MU-MIMO TXOP. In another embodiment, the user terminal 120 may send any data frame, including a quality of service (QoS) null data frame, where the bits 8-15 of the QoS control field indicate a non-empty queue. In this embodiment the user terminal 120 may determine during the setup phase which data frames (e.g., RTS, PS-poll, QoS null, etc.) will trigger a UL-MU-MIMO transmission when the bits 8-15 of the QoS control field indicate a non-empty queue. In one embodiment, the RTS, PS-poll, or QoS null frames may include a 1 bit indication allowing or disallowing the AP 110 to respond with a CTX message 402. In another embodiment, the QoS null frame may include TX power information and a per TID queue information. The TX power information and per TID queue information may be inserted in the two bytes of the sequence control and QoS controls fields in a QoS null frame and the modified QoS null frame may be sent to the AP 110 to request a UL-MU-MIMO TXOP. In another embodiment, referring to FIGS. 1 and 7, the user terminal 120 may send a RTX 701 to request a UL-MU-MIMO TXOP.

In response to receiving an RTS, RTX, PS-poll or QoS null frame, or other trigger frame as described above, an AP 110 may send a CTX message 402. In one embodiment, referring to FIG. 7, after the transmission of the CTX message 402 and the completion of the UL-MU-MIMO transmissions 410A and 410B, TXOP returns to the STAs 120A and 120B which can decide on how to use the remaining TXOP. In another embodiment, referring to FIG. 7, after the transmission of the CTX message 402 and the completion of the UL-MU-MIMO transmissions 410A and 410B, TXOP remains with the AP 110 and the AP110 may use the remaining TXOP for additional UL-MU-MIMO transmissions by sending another CTX message 402 to either STAs 120A and 120B or to other STAs.

Figure 8:
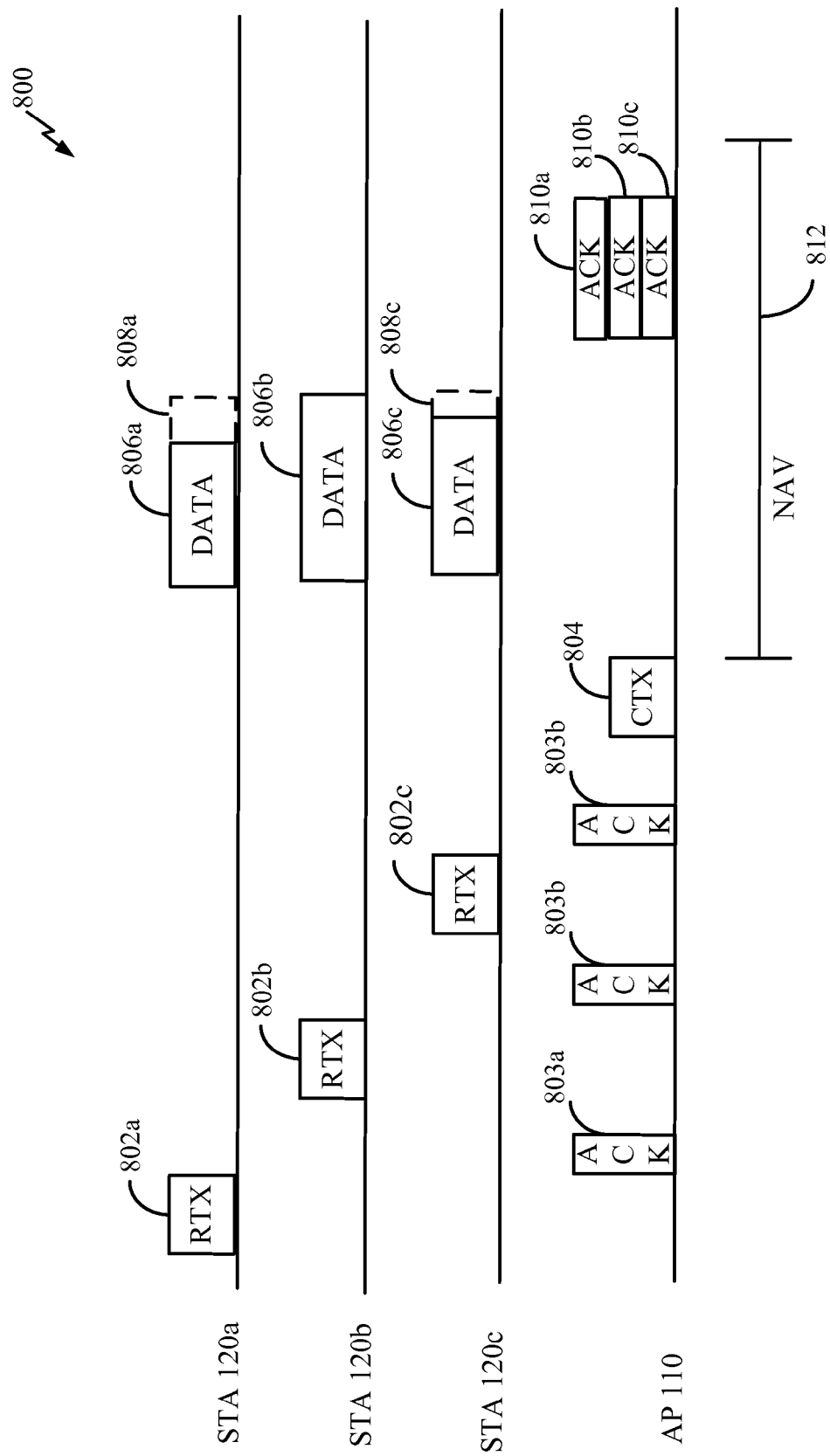
FIG. 8 is a message timing diagram of one embodiment of multi-user uplink communication.

FIG. 8 is a message timing diagram of one embodiment of multi-user uplink communication. Message exchange 800 shows communication of wireless messages between an AP 110 and three stations 120a-c. Message exchange 800 indicates that each of STAs 120a-c transmits a request-to-transmit (RTX) message 802a-c to the AP 110. Each of RTX messages 802a-c indicate that the transmitting station 120a-c has data available to be transmitted to the AP 110.

After receiving each of RTX messages 802a-c, the AP 110 transmits a CTX message 804. In some aspects, the CTX message is transmitted to at least the stations STA 120*a-c*. In some aspects, the CTX message is broadcast. In some aspects, the CTX message indicates which stations are granted permission to transmit data to the AP 110 during a transmission opportunity. The starting time of the transmission opportunity and its duration may be indicated in the CTX message 804 in some aspects. For example, the CTX message 804 may indicate that the stations STA 120*a-c* should set their network allocation vectors to be consistent with NAV 812.

At a time indicated by the CTX message 804, the three stations 120*a-c* transmit data 806*a-c* to the AP 110. The data 806*a-c* are transmitted at least partially concurrently during the transmission opportunity. The transmissions of data 806*a-c* may utilize downlink multi-user multiple input, multiple output transmissions (D-MU-MIMO) or downlink frequency division multiple access (DL-FDMA).

In some aspects, stations STA 120*a-c* may transmit pad data such the transmissions of each station transmitting during a transmission opportunity are of approximately equal duration. Message exchange 800 shows STA 120*a* transmitting pad data 808*a* while STA 120*c* transmits pad data 808*c*. The transmission of pad data ensure that the transmissions from each of the STAs 120*a-c* complete at approximately the same time. This may provide for a more equalized transmission power over the entire duration of the transmission, optimizing AP 110 receiver efficiencies.

After the AP 110 receives the data transmissions 806*a-c*, the AP 110 transmits acknowledgments 810*a-c* to each of the stations 120*a-c*. In some aspects, the acknowledgments 810*a-c* may be transmitted at least partially concurrently using either DL-MU-MIMO or DL-FDMA.

Figure 9:
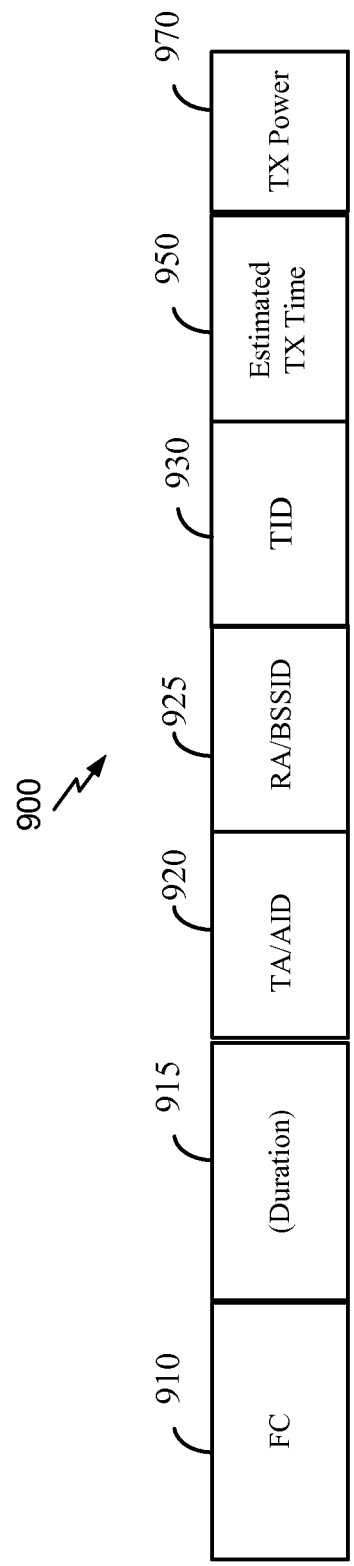
FIG. 9 shows a diagram of one embodiment of a request to transmit (RTX) frame.

FIG. 9 is a diagram of one embodiment of a RTX frame 900. The RTX frame 900 includes a frame control (FC) field 910, a duration field 915 (optional), a transmitter address (TA)/allocation identifier (AID) field 920, a receiver address (RA)/basic service set identifier (BSSID) field 925, a TID field 930, an estimated transmission (TX) time field 950, and a TX power field 970. The FC field 910 indicates a control subtype or an extension subtype. The duration field 815 indicates to any receiver of the RTX frame 900 to set the network allocation vector (NAV). In one aspect, the RTX frame 900 may not have a duration field 815. The TA/AID field 920 indicates the source address which can be an AID or a full MAC address. The RA/BSSID field 925 indicates the RA or BSSID. In one aspect the RTX frame may not contain a RA/BSSID field 925. The TID field 930 indicates the access category (AC) for which the user has data. The Estimated TX time field 950 indicates the time requested for the UL-TXOP and may be the time required for a user terminal 120 to send all the data in its buffer at the current planned MCS. The TX power field 970 indicates the power at which the frame is being transmitted and can be used by the AP to estimate the link quality and adapt the power backoff indication in a CTX frame.

Figure 10:
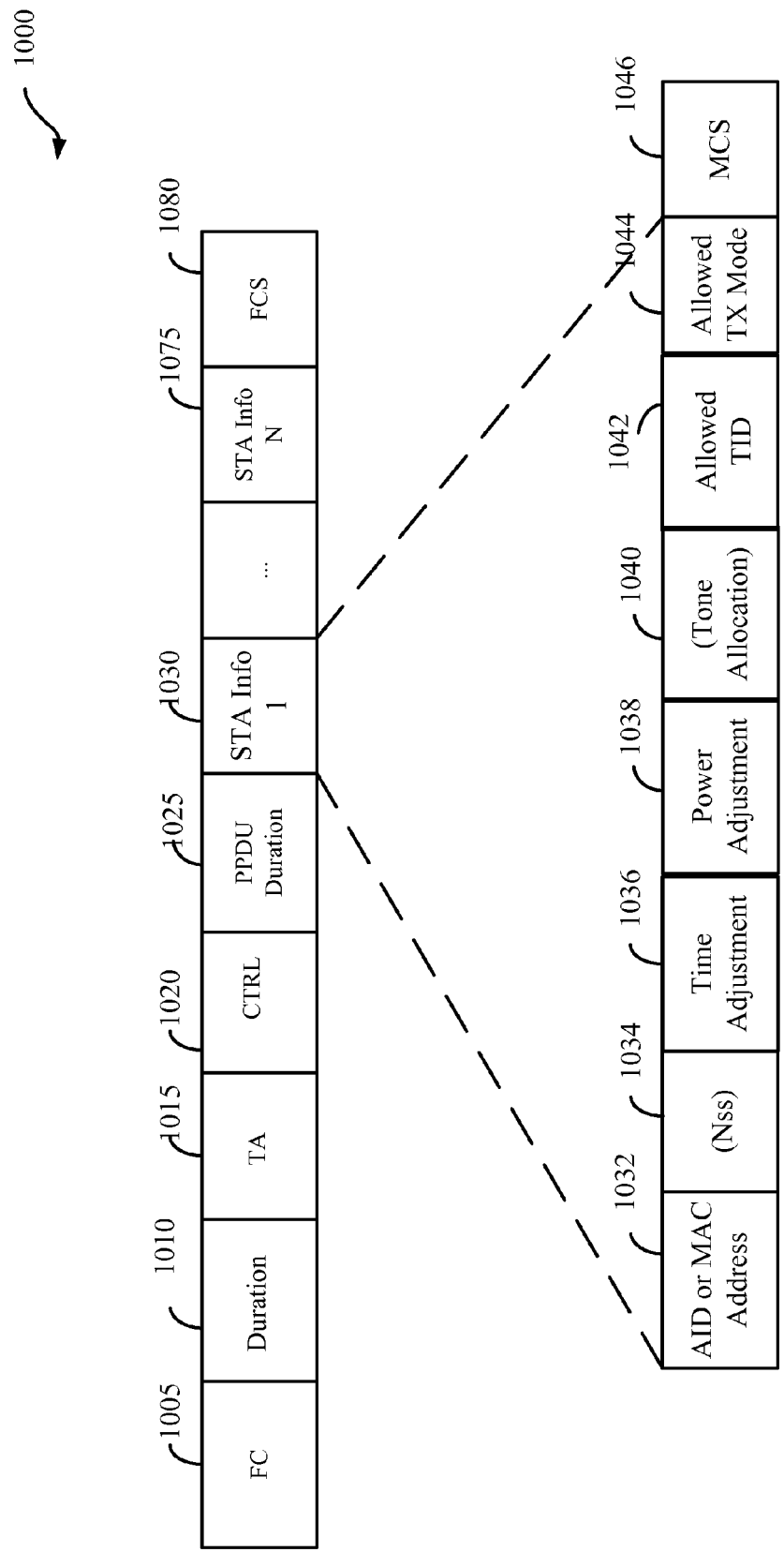
FIGS. 10-13 show examples of a clear to transmit (CTX) frame.

As discussed above, the CTX message 402 may be used in a variety of communications. FIG. 10 is a diagram of an example of a CTX frame 1000 structure. In this embodiment, the CTX frame 1000 is a control frame that includes a frame control (FC) field 1005, a duration field 1010, a transmitter address (TA) field 1015, a control (CTRL) field 1020, a PPDU duration field 1025, a STA info field 1030, and a frame check sequence (FCS) field 1080. The FC field 1005 indicates a control subtype or an extension subtype. The duration field 1010 indicates to any receiver of the CTX frame 1000 to set the network allocation vector (NAV). The TA field 1015 indicates the transmitter address or a BSSID.

The CTRL field 1020 is a generic field that may include information regarding the format of the remaining portion of the frame (e.g., the number of STA info fields and the presence or absence of any subfields within a STA info field), indications for rate adaptation for the user terminals 120, indication of allowed TID, and indication that a CTS must be sent immediately following the CTX frame 1000. The CTRL field 1020 may also indicate if the CTX frame 1000 is being used for UL MU MIMO or for UL FDMA or both, indicating whether a Nss or Tone allocation field is present in the STA Info field 1030. Alternatively, the indication of whether the CTX is for UL MU MIMO or for UL FDMA can be based on the value of the subtype. Note that UL MU MIMO and UL FDMA operations can be jointly performed by specifying to a STA both the spatial streams to be used and the channel to be used, in which case both fields are present in the CTX; in this case, the Nss indication is referred to a specific tone allocation. The PPDU duration 1025 field indicates the duration of the following UL-MU-MIMO PPDU that the user terminals 120 are allowed to send. The STA Info 1030 field contains information regarding a particular STA and may include a per-STA (per user terminal 120) set of information (see STA Info 1 1030 and STA Info N 1075). The STA Info 1030 field may include an AID or MAC address field 1032 which identifies a STA, a number of spatial streams field (Nss) 1034 field which indicates the number of spatial streams a STA may use (in an UL-MU-MIMO system), a Time Adjustment 1036 field which indicates a time that a STA should adjust its transmission compared to the reception of a trigger frame (the CTX in this case), a Power Adjustment 1038 field which indicates a power backoff a STA should take from a declared transmit power, a Tone Allocation 1040 field which indicates the tones or frequencies a STA may use (in a UL-FDMA system), an Allowed TID 1042 field which indicates the allowable TID, an Allowed TX Mode 1044 field which indicates the allowed TX modes, and a MCS 1046 field which indicates the MCS the STA should use. A user terminal 120 receiving a CTX with a Allowed TID 1042 indication may be allowed to transmit data only of that TID, data of the same or higher TID, data of the same or lower TID, any data, or only data of that TID first, then if no data is available, data of other TIDs. The FCS 1080 field indicates the carries an FCS value used for error detection of the CTX frame 1000.

Figure 11:
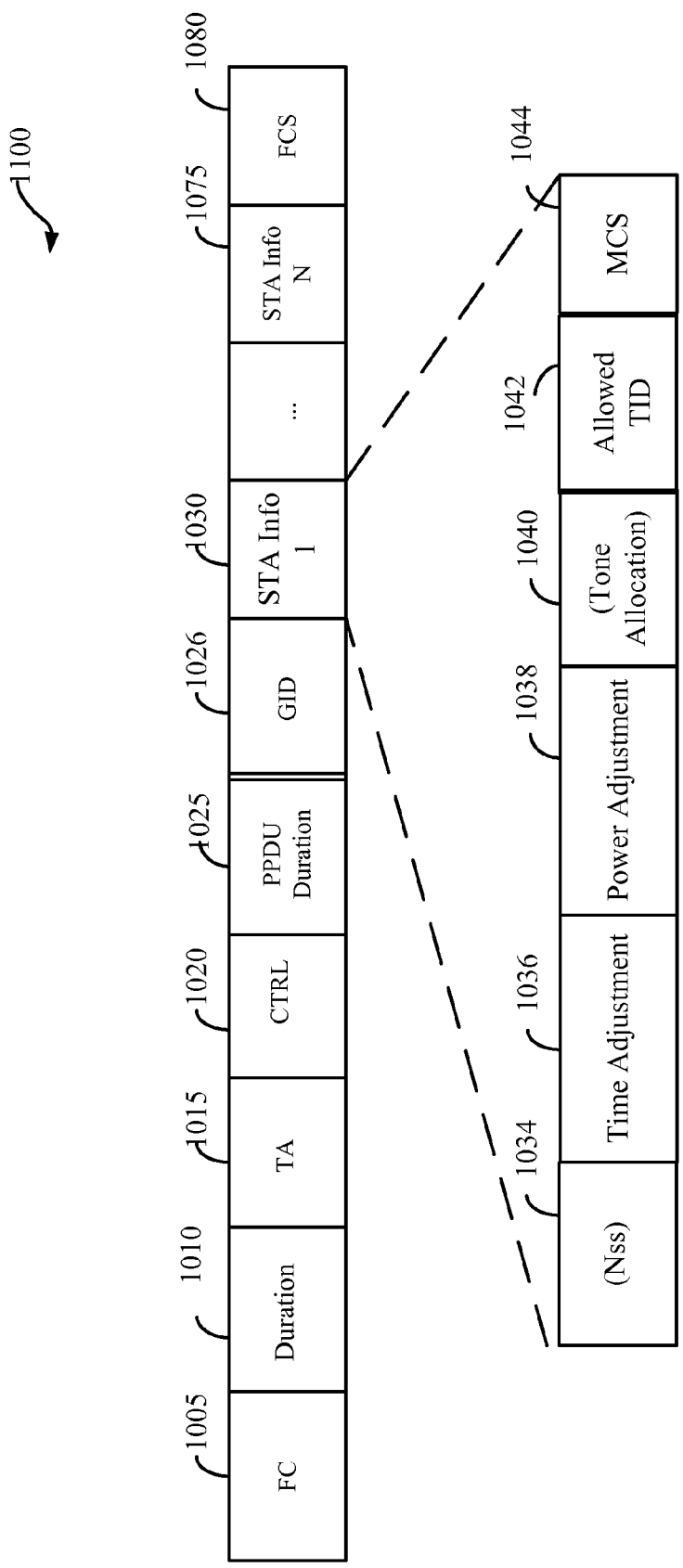
Figure 12:
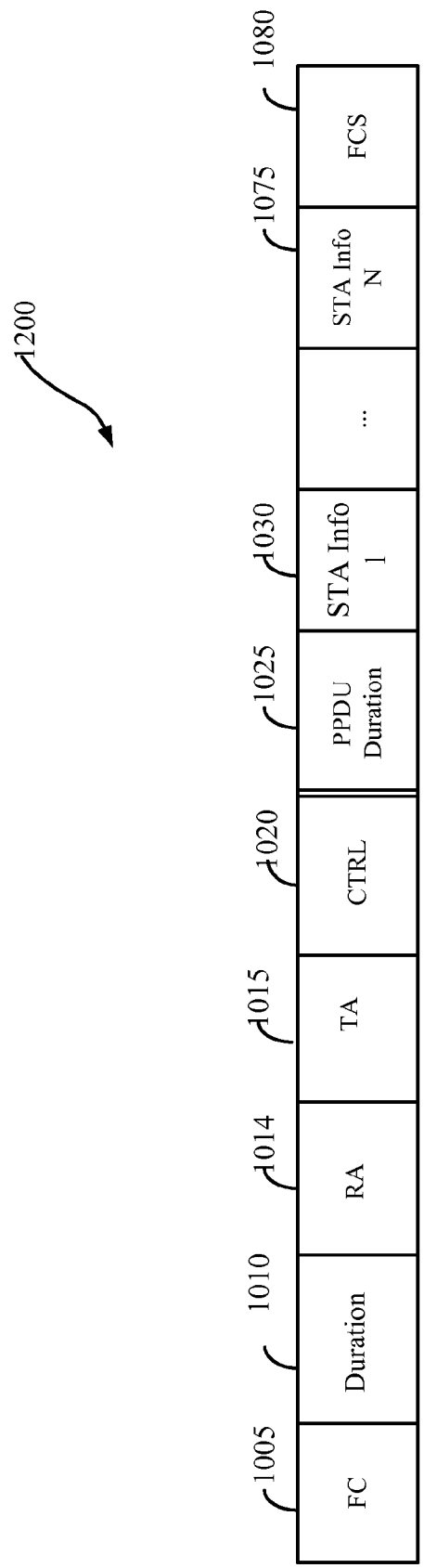

FIG. 11 is a diagram of another example of a CTX frame 1100 structure. In this embodiment and in conjunction with FIG. 10, the STA Info 1030 field does not contain the AID or MAC Address 1032 field and instead the CTX frame 1100 includes a group identifier (GID) 1026 field which identifies the STAs by a group identifier rather than an individual identifier. FIG. 12 is a diagram of another example of a CTX frame 1200 structure. In this embodiment and in conjunction with FIG. 11, the GID 1026 field is replaced with a RA 1014 field which identifies a group of STAs through a multicast MAC address.

Figure 13:
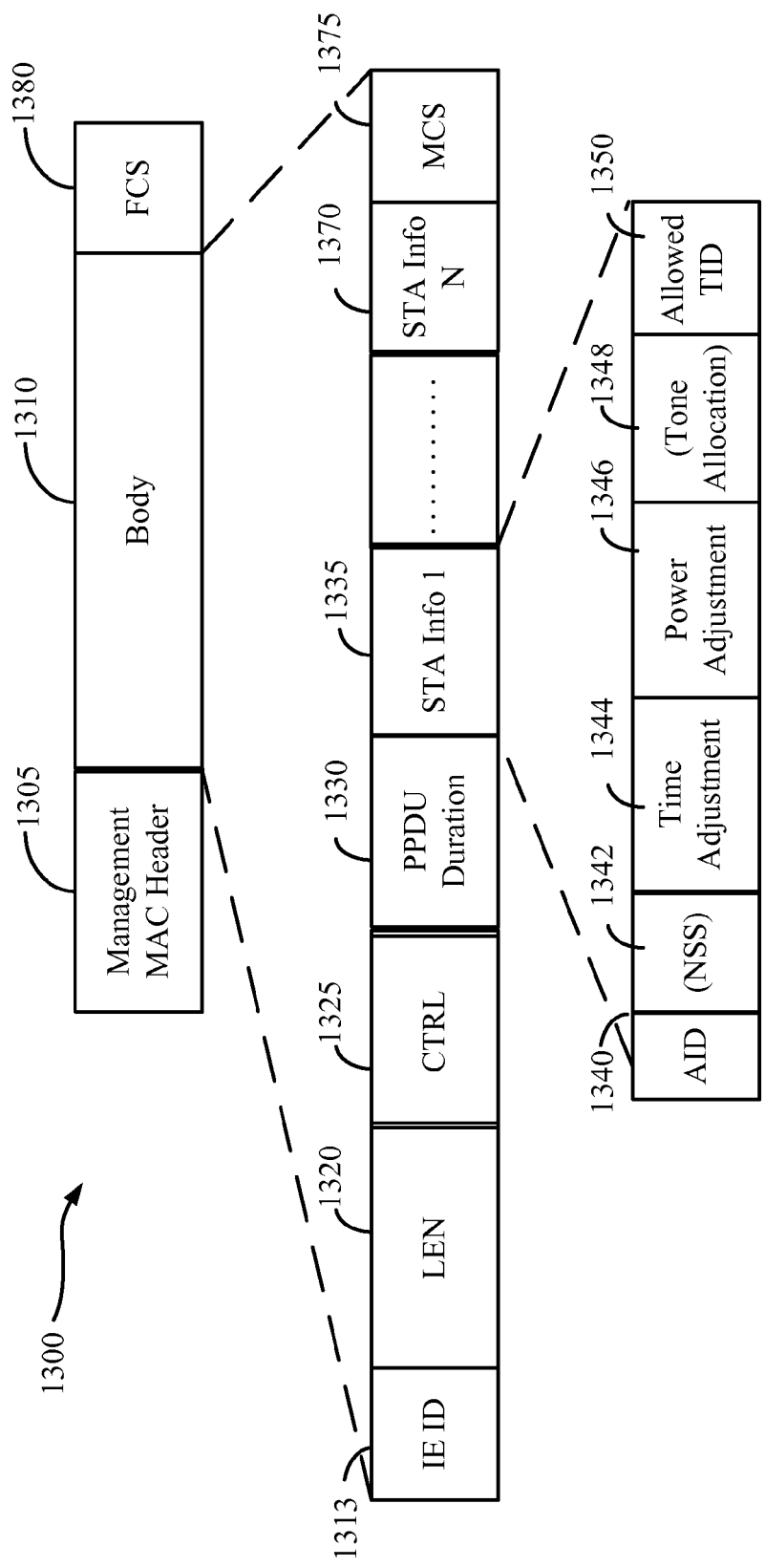

FIG. 13 is a diagram of an example of a CTX frame 1300 structure. In this embodiment, the CTX frame 1300 is a management frame that includes a Management MAC Header 1305 field, a Body 1310 field, and a FCS 1380 field. The Body 1310 field includes an IE ID 1315 field which identifies an information element (IE), a LEN 1320 field which indicates the length of the CTX frame 1300, a CTRL 1325 field which includes the same information as the CTRL 1320 field, a PPDU Duration 1330 field which indicates the duration of the following UL-MU-MIMO PPDU that the user terminals 120 are allowed to send., a STA Info 1 1335 field and a MCS 1375 field which can indicate the MCS for all the STAs to use in the following UL-MU-MIMO transmission, or an MCS backoff for all the STAs to use in the following UL-MU-MIMO transmission. The STA Info1335 (along with STA Info N 1270) field represent a per STA field that includes AID 1340 field which identifies a STA, a number of spatial streams field (Nss) 1342 field which indicates the number of spatial streams a STA may use (in an UL-MU-MIMO system), a Time Adjustment 1344 field which indicates a time that a STA should adjust its transmission compared to the reception of a trigger frame (the CTX in this case), a Power Adjustment 1348 field which indicates a power backoff a STA should take from a declared transmit power, a Tone Allocation 1348 field which indicates the tones or frequencies a STA may use (in a UL-FDMA system), and an Allowed TID 1350 field which indicates the allowable TID.

In one embodiment, the CTX frame 1300 or the CTX frame 1000 may be aggregated in an A-MPDU to provide time to a user terminal 120 for processing before transmitting the UL signals. In this embodiment, padding or data may be added after the CTX to allow a user terminal 120 additional time to process the forthcoming packet. One benefit to padding a CTX frame may be to avoid possible contention issues for the UL signals from other user terminals 120. In one aspect, if the CTX is a management frame, additional padding IEs may be sent. In another aspect the user terminals 120 may request to an AP 110 a minimum duration or padding for the CTX frame.

In some embodiments, an AP 110 may initiate a CTX transmission. In one embodiment, an AP 110 may send a CTX message 402 in accordance with regular enhanced distribution channel access (EDCA) contention protocol. In another embodiment, an AP 110 may send a CTX message 402 at scheduled times. In this embodiment, the scheduled times may be indicated by the AP 110 to the user terminals 120 by using a restricted access window (RAW) indication in a beacon which indicates a time reserved for a group of user terminals 120 to access the medium, a target wake time (TWT) agreement with each user terminal 120 which indicates to multiple user terminals 120 to be awake at the same time to take part in a UL-MU-MIMO transmission, or information in other fields. Outside the RAW and TWT a user terminal 102 may be allowed to transmit any frame, or only a subset of frames (e.g., non-data frames). It may also be forbidden to transmit certain frames (e.g., it may be forbidden to transmit data frames). The user terminal 120 may also indicate that it is in sleep state. One advantage to scheduling a CTX is that multiple user terminals 120 may be indicated a same TWT or RAW time and may receive a transmission from an AP 110.

In one embodiment, a CTX message 402 may include information for a single user terminal 120. In this embodiment, an AP 110 may send multiple CTX messages 402 that include information for one user terminal 120 at the same time to multiple user terminals 120, creating a schedule for the following UL-MU-MIMO transmission 410.

Figure 14A:
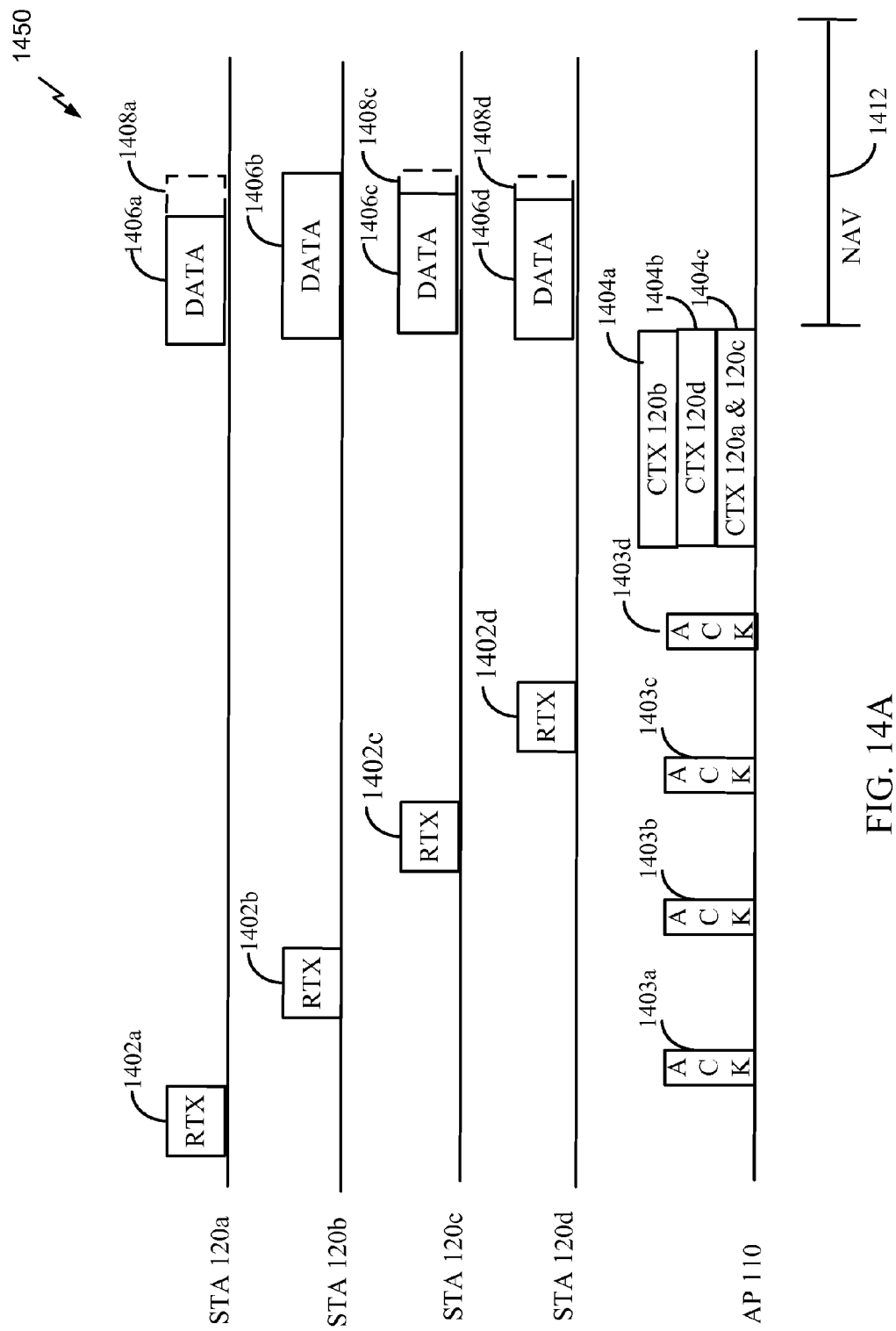
FIG. 14A illustrates a message exchange.

FIG. 14A illustrates a message exchange 1400. FIG. 14A shows each of STAs 120a-d transmitting request-to-transmit messages 1402a-d to AP 110. In response, the AP 110 transmits acknowledgments 1403a-d. The AP 110 then transmits CTX messages 1404a-c to STA 120b, STA 120d, and STA 120a and STA 120c respectively. Each of the messages 1404a-c may be transmitted at least partially concurrently to the four stations 120a-d. While each of CTX messages 1404a and 1404b are addressed to a single station, CTX message 1404c is addressed to a both STA 120a and STA 120c. The CTX messages 1404a-c may indicate a transmission schedule for each of the STAs 120a-d during a transmission opportunity, shown via NAV indicator 1412. For example, the transmission schedule may include a definition of particular spatial streams or frequency bandwidths each of the STAs 120a-d should use for transmissions during the transmission opportunity. As discussed above, each of the CTX messages 1404a-c may also include information relating to particular times that each of the STAs 120a-d should initiate transmissions during the transmission opportunity. In some aspects, each of CTX messages 1404a-c may substantially conform to the format of any of the CTX messages shown in FIGS. 10-13.

In response to reception of the CTX messages 1404a-c, each of stations 120a-d is shown transmitting data messages 1406a-d and optionally additional pad data 1408a and 1408c-d.

Figure 14B:
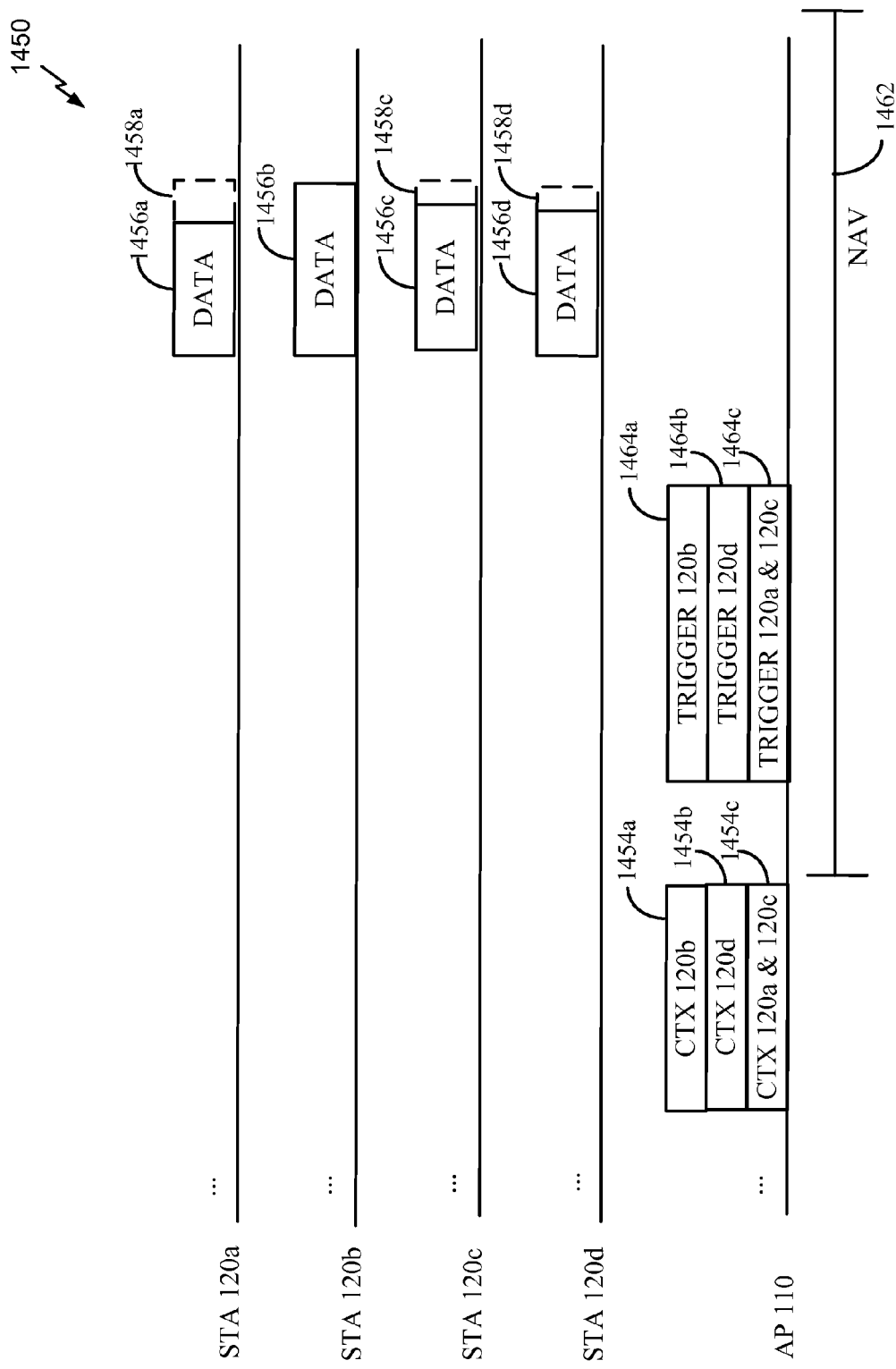
FIG. 14B illustrates a message exchange.

FIG. 14B illustrates a message exchange 1450. In some aspects, the RTX messages 1402a-d and acknowledgment messages 1403a-d may precede the messages shown. FIG. 14B shows the AP 110 transmitting three CTX messages 1454a-c to STAs 120b, 120d, and 120a & 120c respectively. In the illustrated aspect, the CTX messages 1454a-c may not provide the final indication to the STAs 120a-d as to when a transmission during the transmission opportunity (shown by NAV 1462) should begin. Instead, the trigger frames 1464a-c provide that indication. In some aspects, the trigger frames 1464a-c indicate a time when the transmissions by each of STAs 120a-d should be initiated. In other aspects, transmission of the trigger frame itself, such as any of trigger frames 1464a-c indicates that a transmission should begin a predetermined elapsed time after transmission of the trigger frame is completed. In some aspects, the predetermined elapsed time may be a short inter-frame space time (SIFS), a PCF Inter-frame Space (PIFS), or any other period of elapsed, time.

In response to the trigger frames 1464a-c, STAs 120a-d are shown transmitting data messages 1456a-d, which may be optionally padded by pads 1458a and 1458c-d.

Figure 15:
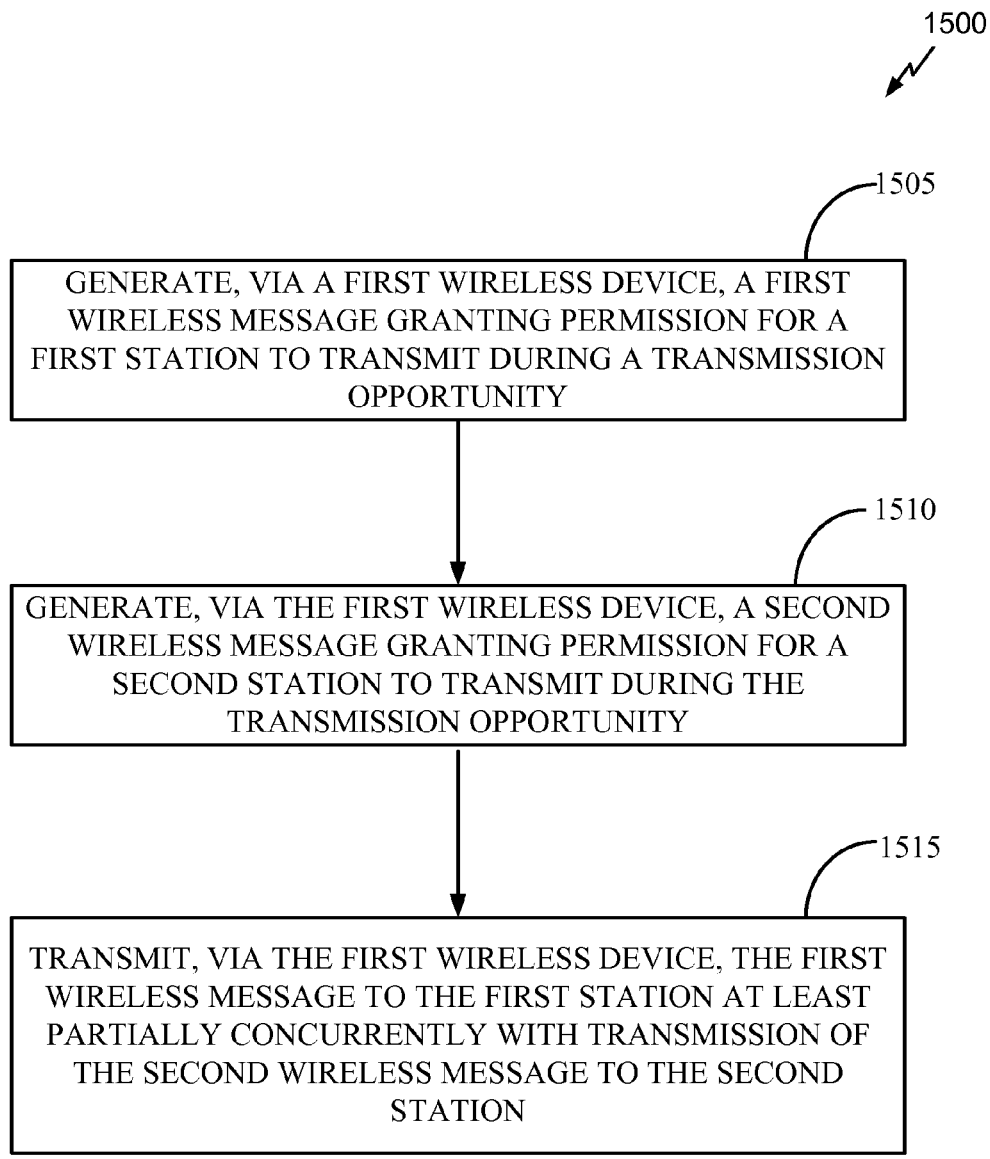
FIG. 15 is a method of transmitting a plurality of clear to transmit messages.

FIG. 15 is a method of transmitting a plurality of clear to transmit messages. In some aspects, the method 1500 may be performed by the wireless device 302. In some aspects, method 1500 may be performed by any of the stations 120a-d or the access point 110 discussed above.

In block 1505, a first message is generated by an AP 110. The first wireless message is generated to include an indicator, (such as a field or combination of fields set to a particular value(s)) to indicate that the AP 110 grants permission for a first station to transmit during a transmission opportunity. In some aspects, the first message is a media protocol data unit (MPDU). In some aspects, the first wireless message is generated to indicate a start time and/or duration of the transmission opportunity. In some aspects, the first message is generated to indicate a time when the first station should initiate a transmission during the transmission opportunity. In some aspects, the first message is generated to include a plurality of media access protocol data units (MPDUs) In some aspects, the message is generated to include one or more of a data frame, control frame, and a management frame.

The first message may be generated to include an indicator that indicates a first time when the first station should initiate a transmission. For example, in some aspects, the indicator may be a duration field. In some aspects, the first message is generated to grant permission to two different stations to transmit during the transmission opportunity. In these aspects, the first message may also indicate a second time when the other station should initiate a transmission. In some aspects, the first and second times are different. In some aspects, the first message is generated to include an indicator indicating a spatial stream that the first station should use for transmissions during the transmission opportunity. For example, the first message may include this indicator when using uplink MU MIMO to receive data from the first station. In some aspects, the first message may be generated to include an indicator (such as a field) indicating a frequency the first station should use when transmitting during the transmission opportunity. For example, the first message may include this frequency indicator when the wireless device is using uplink frequency division multiple access (FDMA) to receive data from the second station. In some aspects, the spatial stream or frequency indicated by the first message in these aspects may be the same or different from a spatial stream or frequency used to transmit the first wireless message (discussed below).

In block 1510, the first wireless device generates a second wireless message. The second wireless message is generated to include an indicator (such as a field) that indicates that the first wireless device grants permission for a second station to transmit during the transmission opportunity. In some aspects, the second wireless message is generated to indicate (via a field or sub-field) a start time and/or duration of the transmission opportunity. In some aspects, the second message is generated to indicate a time when the second station should initiate a transmission during the transmission opportunity. In some aspects, the transmission initiation time indicated by the second message is different than the transmission initiation time indicated by the first message.

In some aspects, the second message is generated to include an indicator indicating a spatial stream that the second station should use for transmissions during the transmission opportunity. For example, the second message may include this indicator when using uplink MU MIMO to receive data from the second station. In some aspects, the second message may be generated to include an indicator (such as a field) indicating a frequency the second station should use when transmitting during the transmission opportunity. For example, the second message may include this frequency indicator when the wireless device is using uplink frequency division multiple access (FDMA) to receive data from the second station. In some aspects, the spatial stream or frequency indicated by the first second in these aspects may be the same or different from a spatial stream or frequency used to transmit the second wireless message (discussed below).

In block 1515, the first wireless device transmits the first wireless message to the first station at least partially concurrently with transmission of the second wireless message to the second station. In some aspects, the first and/or second wireless message(s) may be any of the CTX messages described above with respect to FIGS. 10-13. In some aspects where the first wireless message indicates that two different stations (for example, the first station and a third station) are granted permission to transmit during the transmission opportunity, the first wireless message is also transmitted to the third station.

In some aspects, the first and second messages are transmitted over different spatial streams or over different frequencies. For example, in some aspects, the first and second messages are transmitted via downlink frequency division multiple access or downlink multi-user MIMO. In some aspects, transmission of the first and second messages may be initiated at either the same time or at different times during the transmission opportunity.

In some aspects, the first and/or second wireless message(s) are transmitted to a third and/or four station(s) respectively. In these aspects, the first wireless message is generated to indicate that permission is granted to the third station to transmit during the transmission opportunity. Similarly, if the second wireless message is transmitted to a fourth station, the second wireless message is generated to indicate that the fourth station is granted permission to transmit during the transmission opportunity. In these aspects, the first and/or second messages are transmitted both to the first and third stations, and/or second and fourth stations respectively.

In some aspects, a first trigger frame may be transmitted to the first station after the first wireless message is transmitted. A second trigger frame may be transmitted to the second station after the second wireless message is transmitted. In some aspects, the first and second trigger frames are transmitted at least partially concurrently. For example, the two trigger frames may be transmitted using either DL-MU-MIMO or DL-FDMA in some aspects.

As described above, the trigger frame may indicate a time within the transmission opportunity when a station receiving the trigger frame should transmit. In some aspects, a trigger frame may be transmitted to more than one device. For example, the first trigger frame may be transmitted to the first and third devices discussed above in some aspects. When a trigger frame is transmitted to multiple devices, the trigger frame may indicate a time within the transmission opportunity when each device should initiate a transmission. In various aspects, the time to initiate a transmission indicated by the trigger frame may be the same time or a different time for each of the devices to which the trigger frame is transmitted. In some aspects, the trigger frame indicates that transmission should be initiated a predetermined time period after completion of the transmission of the trigger frame. For example, in some aspects, transmission should be initiated SIFS or PIFS time after the trigger frame is transmitted.

Some aspects of method 1500 include receiving data from the first station and receiving data from the second station at least partially concurrently. For example, in some aspects, data from the first and second stations may be received via uplink frequency division multiple access or uplink multi-user MIMO.

Figure 16:
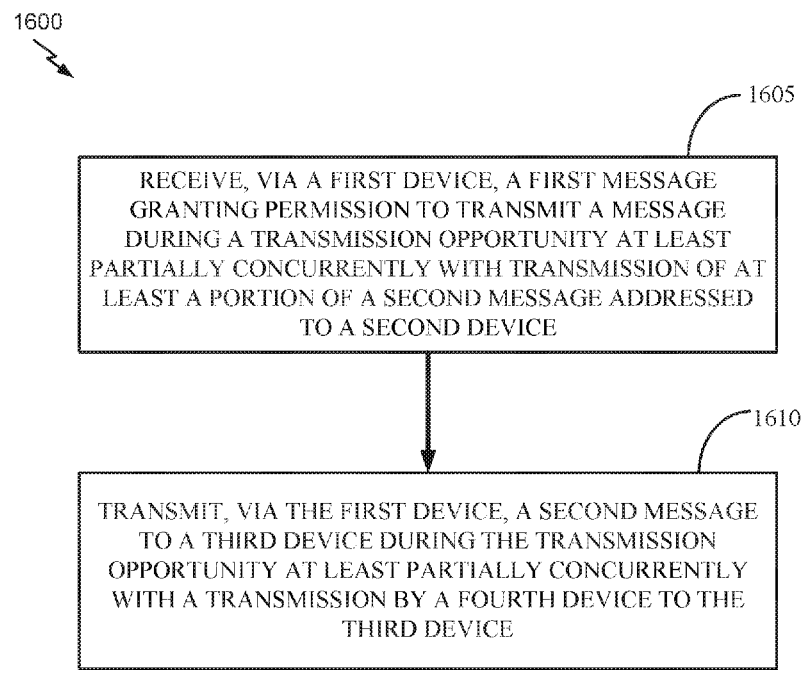
FIG. 16 is a method of receiving a clear to transmit message.

FIG. 16 is a method of receiving a clear to transmit message. Method 1600 may be performed, in some aspects, by the device 302. In some aspects, method 1600 may be performed by the access point 110 or any of the stations 120*a-d* discussed above.

In block 1605, a first device receives a first message granting permission to transmit a message during a transmission opportunity. In some aspects, the first message may indicate the grant of permission via a particular value in a particular field (offset) of the first message. The reception of the first message occurs at least partially concurrently with transmission of at least a portion of a second message addressed to another/second device. In some aspects, both the first and second messages are transmitted by a third device. In some aspects, the first message is received via downlink frequency division multiple access (DL-FDMA). For example, the first message may be received over a first frequency band while the transmission of the second message occurs over a second frequency band.

In some aspects, the first message is received via downlink multi-user MIMO. For example, the first message may be received over a first spatial stream while the second message transmission occurs over a second spatial stream.

In some aspects, the first message may include an indicator (such as a field) indicating a spatial stream and/or a frequency the first device should use for transmissions during the transmission opportunity. For example, the first message may include a field that defines the spatial stream or frequency. This indicated spatial stream and/or frequency may be the same or different than the spatial stream and/or frequency used to receive the first message.

The first device may decode the message to determine the permission has been granted. In some aspects, the message a plurality of MPDU's may be decoded from the message. In some aspects, the message may be decoded to identify one or more of a data frame, control frame, and management frame. In some aspects, the first message is decoded to determine a length and/or a start time of a transmission opportunity. In some aspects, the first message is decoded to determine a time to initiate a transmission during the transmission opportunity.

In block 1610, the first device transmits a third message to the third device during the transmission opportunity. The transmission occurs at least partially concurrently with a transmission of a fourth message by a fourth device to the third device. In some aspects, the second and fourth devices are the same devices. In some aspects, the first device transmits the third message using either uplink frequency division multiple access or uplink multi-user MIMO. For example, the first device may transmit the third message over a first spatial stream while the transmission of the fourth message occurs over a second spatial stream. Alternatively, the first device may transmit the third message over a first frequency bandwidth while the transmission of the fourth message occurs over a second frequency bandwidth.

Some aspects of method 1600 include receiving a trigger frame as discussed above. In some aspects, the trigger frame is decoded to determine a particular time when a transmission should be initiated within the transmission opportunity. For example, in some aspects, the trigger frame includes a field, which is decoded to determine the time. In other aspects, the time of the trigger frame itself indicates when transmission should be initiated. For example, in some aspects, the trigger frame indicates transmission should be initiated a predetermined period of time after transmission of the trigger frame is complete. For example, in some aspects, a trigger frame indicates transmission should be initiated SIFS or PIFS or any duration of time after completion of the transmission of the trigger frame.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method of wireless communication by an apparatus, comprising:
   generating, via a processor, a first wireless message granting permission for a first station to transmit during a transmission opportunity;
   generating, via the processor, a second wireless message granting permission for a second station to transmit during the transmission opportunity;
   transmitting, via a transmitter, the first wireless message to the first station at least partially concurrently with transmission of the second wireless message to the second station, wherein transmission of the first and second wireless messages is initiated at the same time; and
   receiving, via a receiver, a first data message from the first station at least partially concurrently with a second data message from the second station during the transmission opportunity,
   wherein the first wireless message is transmitted over a first spatial stream and the second wireless message is transmitted over a second spatial stream or the first wireless message is transmitted over a first frequency and the second wireless message is transmitted over a second frequency.

2. The method of claim 1, further comprising generating the first and second wireless messages to indicate a start time and duration of the transmission opportunity.

3. The method of claim 1, wherein the first wireless message comprises an indicator indicating a first spatial stream that the first station should use for transmissions during the transmission opportunity, and wherein the second wireless message comprises an indicator indicating a second spatial stream that the second station should use for transmissions during the transmission opportunity.

4. The method of claim 1, wherein the first wireless message comprises an indicator indicating a first frequency that the first station should use for transmissions during the transmission opportunity, and wherein the second wireless message comprises an indicator indicating a second frequency that the second station should use for transmissions during the transmission opportunity.

5. The method of claim 1, further comprising further generating the first wireless message to grant permission for a third station to transmit during the transmission opportunity, and transmitting the first wireless message to the third station at least partially concurrently with the transmission of the second wireless message to the second station.

6. The method of claim 1, further comprising:
   generating a third wireless message directing the first station to initiate a transmission a predetermined elapsed time after receipt of the third wireless message;
   generating a fourth wireless message directing the second station to initiate transmission after a predetermined elapsed time after the fourth wireless message; and
   transmitting the third wireless message to the first station at least partially concurrently with transmitting the fourth wireless message to the second station.

7. The method of claim 1, further comprising:
   generating the first wireless message to indicate a first time within the transmission opportunity when the first wireless device should initiate transmission; and
   generating the second wireless message to indicate a second time within the transmission opportunity when the second wireless device should initiate transmission, wherein the first and second times are different.

8. The method of claim 1, further comprising generating the first message as an aggregated media protocol data unit (A-MPDU).

9. The method of claim 1, further comprising generating the first message to comprise a data, control, or management message.

10. The method of claim 1, further comprising generating the first wireless message to grant permission for a third station to transmit during a transmission opportunity, wherein the transmission of the first wireless message is also to the third station.

11. An apparatus for wireless communication, comprising:
   a processor configured to generate a first wireless message granting permission for a first station to transmit during a transmission opportunity and generate a second wireless message granting permission for a second station to transmit during the transmission opportunity;
   a transmitter configured to transmit the first wireless message to the first station at least partially concurrently with transmission of the second wireless message to the second station, the transmitter further configured to initiate transmission of the first and second wireless messages at the same time; and
   a receiver configured to receive a first data message from the first station at least partially concurrently with a second data message from the second station during the transmission opportunity,
   wherein the transmitter is configured to transmit the first wireless message over a first spatial stream and transmit the second wireless message over a second spatial stream or the transmitter is configured to transmit the first wireless message over a first frequency and transmit the second wireless message over a second frequency.

12. The apparatus of claim 11, wherein the first wireless message comprises an indicator indicating a first spatial stream that the first station should use for transmissions during the transmission opportunity, and wherein the second wireless message comprises an indicator indicating a second spatial stream that the second station should use for transmissions during the transmission opportunity.

13. The apparatus of claim 11, wherein the first wireless message comprises an indicator indicating a first frequency that the first station should use for transmissions during the transmission opportunity, and wherein the second wireless message comprises an indicator indicating a second spatial stream that the second station should use for transmissions during the transmission opportunity.

14. The apparatus of claim 11, wherein the processor is further configured to generate the first and second wireless messages to indicate a start time and duration of the transmission opportunity.

15. The apparatus of claim 11, wherein the processor is further configured to generate the first wireless message to grant permission for a third station to transmit during the transmission opportunity, and transmitting the first wireless message to the third station at least partially concurrently with the transmission of the second wireless message to the second station.

16. The apparatus of claim 11, wherein the processor is further configured to generate a third wireless message directing the first station to initiate a transmission a predetermined elapsed time after receipt of the third wireless message, generate a fourth wireless message directing the second station to initiate transmission a predetermined elapsed time after the fourth wireless message, and the transmitter is further configured to transmit the third wireless message to the first station at least partially concurrently with transmitting the fourth wireless message to the second station.

17. The apparatus of claim 11, wherein the processor is further configured to generate the first wireless message to indicate a first time within the transmission opportunity when the first wireless device should initiate transmission, and generate the second wireless message to indicate a second time within the transmission opportunity when the second wireless device should initiate transmission, wherein the first and second times are different.

18. The apparatus of claim 11, wherein the processor is further configured to generate the first message as an aggregated media protocol data unit (A-MPDU).

19. The apparatus of claim 11, wherein the processor is further configured to generate the first message to comprise a data, control, or management message.

20. The apparatus of claim 11, wherein the processor is further configured to generate the first wireless message to grant permission for a third station to transmit during a transmission opportunity; wherein the transmission of the first wireless message is also to the third station.

21. A method of wireless communication, comprising:
receiving, via a first device, a first wireless message granting permission for the first device to transmit a message during a transmission opportunity, the first wireless message transmitted to the first device at least partially concurrently with a transmission of at least a portion of a second wireless message addressed to a second device; and
transmitting, via the first device, a third message to a third device during the transmission opportunity at least partially concurrently with a transmission of a fourth message by a fourth device to the third device,
wherein the first wireless message is received over a first spatial stream and the second wireless message is transmitted over a second spatial stream or the first wireless message is received over a first frequency and the second wireless message is transmitted over a second frequency.

22. The method of claim 21, further comprising:
receiving, via the first device, a fifth message; and
decoding the fifth message to determine whether the first device should initiate transmission during the transmission opportunity at a particular time, wherein the transmission of the third message is initiated at the particular time based on the fifth message.

23. An apparatus for wireless communication, comprising:
a receiver configured to receive a first message granting permission for a first device to transmit a message during a transmission opportunity, the first message transmitted to the first device at least partially concurrently with a transmission of at least a portion of a second message addressed to a second device; and
a transmitter configured to transmit, via the first device, a third message to a third device during the transmission opportunity at least partially concurrently with a transmission of a fourth message by a fourth device to the third device,
wherein the receiver is configured to receive the first wireless message over a first spatial stream while the transmission of the second wireless message is over a second spatial stream or the receiver is configured to transmit the first wireless message over a first frequency while the second wireless message is transmitted over a second frequency.

24. The apparatus of claim 23, wherein the receiver is further configured to receive a fifth message; and the processor is further configured to decode the fifth message to determine whether the first device should initiate transmission during the transmission opportunity at a particular time, wherein the transmitter is further configured to initiate the transmission of the third message at the particular time based on the fifth message.

* * * * *